United States Patent
Honda

(10) Patent No.: US 7,061,840 B2
(45) Date of Patent: Jun. 13, 2006

(54) DEFECT DETECTION APPARATUS AND DEFECT DETECTION METHOD

(75) Inventor: Yukihisa Honda, Kanagawa (JP)

(73) Assignee: Sony Corporation (JP)

( * ) Notice: Subject to any disclaimer, the term of this patent is extended or adjusted under 35 U.S.C. 154(b) by 267 days.

(21) Appl. No.: 10/490,481

(22) PCT Filed: Aug. 6, 2003

(86) PCT No.: PCT/JP03/10009

§ 371 (c)(1),
(2), (4) Date: Mar. 23, 2004

(87) PCT Pub. No.: WO2004/013854

PCT Pub. Date: Feb. 12, 2004

(65) Prior Publication Data

US 2004/0240355 A1 Dec. 2, 2004

(30) Foreign Application Priority Data

Aug. 6, 2002 (JP) ............................... 2002-228397

(51) Int. Cl.
*G11B 7/00* (2006.01)

(52) U.S. Cl. ................................ 369/53.15; 369/53.32
(58) Field of Classification Search ............. 369/53.15, 369/53.32, 53.33, 53.35, 47.18
See application file for complete search history.

(56) References Cited

U.S. PATENT DOCUMENTS 6,762,982 B1 * 7/2004 Armitage ................ 369/47.25

FOREIGN PATENT DOCUMENTS

JP 5-273141 A 10/1993
JP 2002-183950 A 6/2002

OTHER PUBLICATIONS

International Search Report.

* cited by examiner

*Primary Examiner*—Nabil Hindi
(74) *Attorney, Agent, or Firm*—Rader, Fishman & Grauer, PLLC; Ronald P. Kananen

(57) ABSTRACT

A subtraction results value arrived at by subtracting a required subtraction value from a detection maximum value is taken as a maximum value in cases where a detection maximum value obtained from an RF signal is in a reducing direction, and an addition results value arrived at by adding a required value to a detection minimum value is taken as a minimum value in cases where a detection minimum value obtained from an RF signal is in an increasing direction. An RF amplitude value indicating an amplitude level of an RF signal is then obtained by subtracting the minimum value from the maximum value. Also, the subtraction value or the addition value is variably set according to the center value for the amplitude of the RF signal increasing or decreasing in excess of a prescribed level. As a result, accuracy of defect detection can be improved in cases where the amplitude level of the RF signal is biased on the maximum value side or the minimum value side.

3 Claims, 12 Drawing Sheets

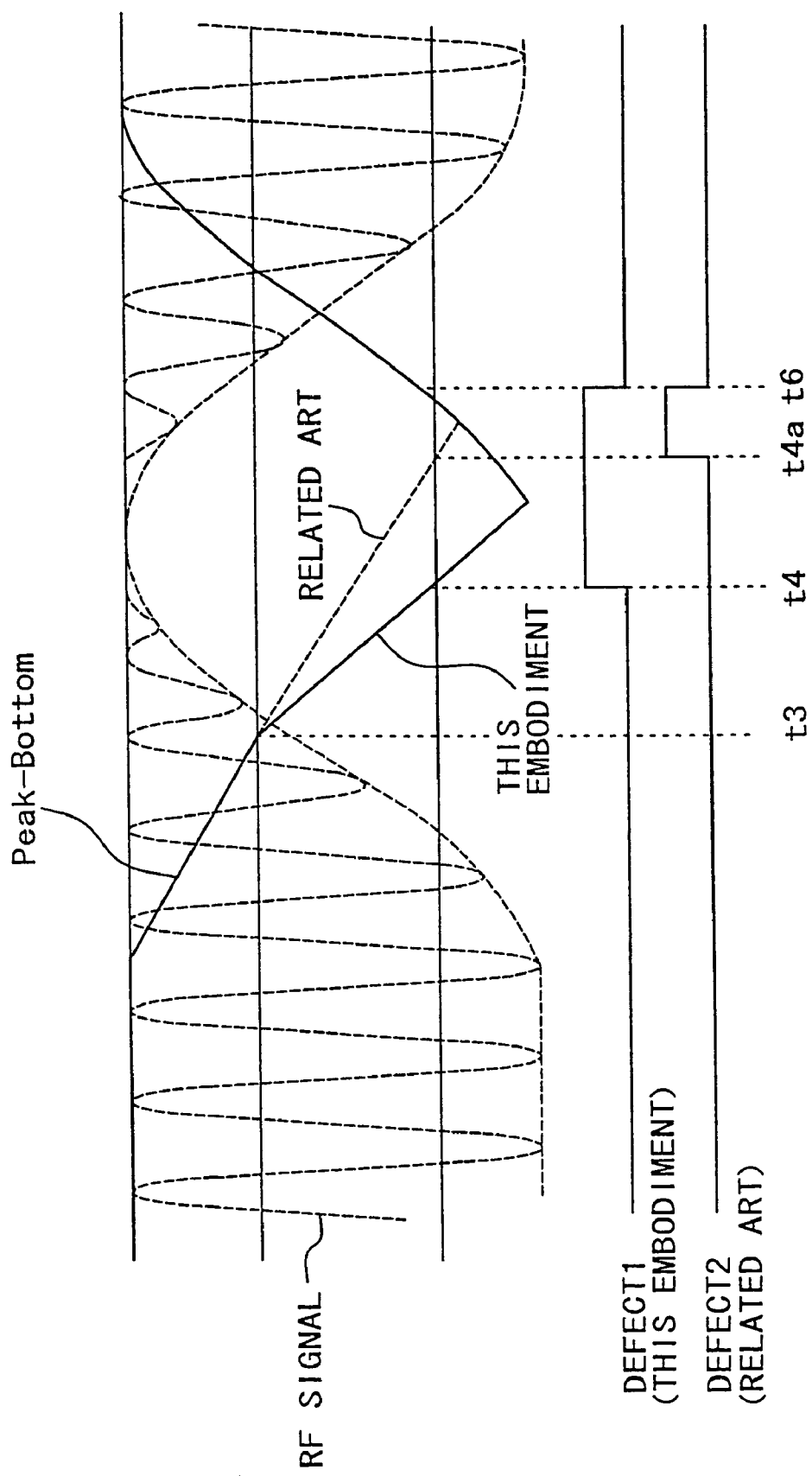

DEFECT DETECTION APPARATUS AND DEFECT DETECTION METHOD

TECHNICAL FIELD

The present invention relates to a defect detection apparatus for detecting so-called defect (DEFECT) statuses that are states where a recording signal cannot be read normally due to blemishes or deposits etc. on a signal surface of, for example, a loaded disc recording medium, and a defect detection method for this defect detection apparatus.

BACKGROUND ART

For example, disc playback apparatuses capable of playing back digital data recorded on optical discs such as CDs (Compact discs) or DVDs (Digital Versatile Discs) etc. have become widespread.

With this kind of disc playback apparatus, there are cases where it is no longer possible to normally read signals recorded on the optical disc when there are blemishes or deposits on a signal surface of a loaded optical disc. In accompaniment with this, a read signal can no longer be correctly recognized, and it is no longer possible to carry out normal data playback.

In this kind of situation the amplitude level of a playback RF signal obtained by detecting reflected light for laser light irradiated onto the disc becomes naturally small. As a result, on the playback apparatus side, a state where amplitude level of a playback RF signal greater than a prescribed value cannot be obtained due to blemishes etc. on the disc described above is detected as a so-called defect (DEFECT) state. By detecting this kind of defect status, the presence of states where data reading is not carried out correctly from the disc is recognized for each part, and a corresponding required control operation can be carried out.

It is first necessary to detect maximum values and minimum values in inputted RF signals while detecting this kind of defect status. It is then possible to obtain an RF signal amplitude level by subtracting the minimum value from the detected maximum value. In addition, it is possible to detect a defect status by determining whether or not this amplitude level falls below a prescribed level set as a defect threshold value.

Here, when maximum values and minimum values detected from the RF signal as described above when detecting the defect conditions are utilized as is, for example, in cases where the RF signal amplitude abruptly changes, these maximum values and minimum values follow these fluctuations as is. In accompaniment with this, these kind of level fluctuations are also followed as is even for amplitude levels calculated from these maximum values and minimum values.

As a result, in cases where, for example, amplitude level of an RF signal simply drops abruptly when carrying out defect detection utilizing maximum values and minimum values detected from an RF signal in this manner as it is, a defect status is detected with the effect that erroneous detection of defect statuses is induced.

Because of this, in the related art, the maximum and minimum values are made to gently follow changes in an actual RF amplitude level in order to prevent erroneous detection of defect statuses.

FIG. 10 is a block diagram showing an internal configuration for a defect detection circuit 100 of the related art.

In FIG. 10, a playback RF signal obtained by detecting reflected light of laser light illuminated onto a disc signal surface is first supplied to this defect detection circuit 100. This playback RF signal is converted to digital data at an A/D converter 105 shown in the drawings, and is supplied to a maximum value hold circuit 106 and minimum value hold circuit 111.

The maximum value hold circuit 106 detects maximum values for fixed sections of the RF signal supplied by the A/D converter 105 and holds detected maximum values as section maximum values. These held section maximum values are then outputted to a maximum value selector 107 and a maximum value comparator circuit 109 at prescribed timings.

A section maximum value outputted by the maximum value hold circuit 106 and a subtraction results value outputted by a subtraction circuit 110 described later are inputted to the maximum value selector 107. Further, together with this, a comparison results signal from the maximum value comparator circuit 109 described later is also input to the maximum value selector 107.

The maximum value selector 107 then selectively outputs one of the inputted section maximum value and the subtraction results value to a maximum value storage circuit 108 according to the comparison results signal inputted by the maximum value comparator circuit 109.

The maximum value storage circuit 108 then takes as input and stores the section maximum value or the subtraction results value outputted by the maximum value selector 107. By outputting values stored in this manner at a prescribed timing, the stored section maximum value or subtraction results value is output to a subtractor 117 as a value Peak shown in the drawings. Further, the value Peak outputted by the maximum value storage circuit 108 in this manner is also provided to the maximum value comparator circuit 109 and the subtraction circuit 110.

An internally fixed value "α" is set at the subtraction circuit 110. This fixed value "α" is then subtracted from the value Peak inputted by the maximum value storage circuit 108 as described above and the value calculated as a result of this is outputted to the maximum value selector 107 as a subtraction results value.

The maximum value comparator circuit 109 compares the value Peak provided by the maximum value storage circuit 108 and the section maximum value provided by the maximum value hold circuit 106 described previously. In other words, a section maximum value (current maximum value) detected at a current detection section at the maximum value hold circuit 106 and the value Peak (maximum value for one time before) outputted by the maximum value storage circuit 108 corresponding to one detection section previous as viewed from this current detection section are compared at the maximum value comparator circuit 109. As a result of this, at the maximum value comparator circuit 109, it is possible to discriminate as to whether the current maximum value for the RF signal has increased or decreased with respect to one maximum value previous.

When it is determined that the section maximum value supplied by the maximum value hold circuit 106 is greater than the value Peak supplied by the maximum value storage circuit 108, the maximum value comparator circuit 109 outputs a comparison results signal for selectively outputting a section maximum value to the maximum value selector 107 described previously. In other words, when the current maximum value supplied by the maximum value hold circuit 106 is greater than the maximum value for one time previous provided by the maximum value storage circuit 108, the section maximum value held by the maximum value hold circuit 106 is selectively output as the value Peak.

On the other hand, when it is determined that the aforementioned section maximum value is smaller than the value Peak, the comparison results signal for selectively outputting the subtraction results value from the subtraction circuit 110 is outputted to the maximum value selector 107. In other words, when the current maximum value for the RF signal has decreased from the maximum value one previous, a subtraction results value from the subtraction circuit 110 is selected for output.

According to the above description, when the RF signal maximum value is in the increasing direction, the section maximum value detected by the maximum value hold circuit 106 as the value Peak is outputted from the maximum value storage circuit 108. With regards to this, when the maximum value of the RF signal is in a reducing direction, a value (subtraction results value) that is a fixed value "α" subtracted from the value Peak outputted one time before is outputted as the value Peak.

In other words, in this case, when the maximum value for the RF signal is in the reducing direction, a value Peak that is reduced at a fixed rate is adopted as the value Peak outputted from the maximum value storage circuit 108.

The minimum value hold circuit 111 detects minimum values for fixed sections of the RF signal supplied by the A/D converter 105 and holds detected minimum values as section minimum values. These held section minimum values are then outputted to a minimum value selector 112 and a minimum value comparator circuit 114 at prescribed timings.

A section minimum value outputted by the minimum value hold circuit 111 and an addition results value outputted by an addition circuit 115 described later are inputted to the minimum value selector 112. Further, a comparison results signal from the minimum value comparator circuit 114 described later is also input to the minimum value selector 112.

The minimum value selector 112 then selectively outputs one of the inputted section minimum value and the addition results value to a minimum value storage circuit 113 according to the comparison results signal inputted by the minimum value comparator circuit 114.

The minimum value storage circuit 113 then takes as input and stores the section minimum value or the addition results value outputted by the minimum value selector 112 as described above. By outputting values stored in this manner at a prescribed timing, the stored section minimum value or addition results value is supplied to the subtractor 117, the minimum value comparator circuit 114 and the addition circuit 115 as a value Bottom shown in the drawings.

An internally fixed value "β" is set at the addition circuit 115. Then, at this addition circuit 115, this value β is added to the value Bottom provided by the minimum value storage circuit 113, and the value calculated as a result is output to the minimum value selector 112 as the addition results value.

The minimum value comparator circuit 114 compares the value Bottom provided by the minimum value storage circuit 113 and the section minimum value provided by the minimum value hold circuit 111 described previously. In other words, a section minimum value (current minimum value) detected at a current detection section at the minimum value hold circuit 111 and the value Bottom (minimum value for one time before) outputted by the minimum value storage circuit 113 corresponding to one detection section previous as viewed from this current detection section are compared at the minimum value comparator circuit 114. As a result of this, at the minimum value comparator circuit 114, it is possible to discriminate as to whether the current minimum value for the RF signal has increased or decreased with respect to one minimum value previous.

When it is determined that the section minimum value supplied by the minimum value hold circuit 111 is less than the value Bottom supplied by the minimum value storage circuit 113, the minimum value comparator circuit 114 outputs a comparison results signal for selectively outputting a section minimum value to the minimum value selector 112 described previously. In other words, when the current minimum value supplied by the minimum value hold circuit 111 is less than the minimum value for one time previous provided by the minimum value storage circuit 113, the section maximum value held by the minimum value hold circuit 111 is selectively output as the value Bottom.

On the other hand, when it is determined that the aforementioned section minimum value is larger than the value Peak, the comparison results signal for selectively outputting the addition results value from the addition circuit 115 is outputted to the minimum value selector 112. In other words, when the current minimum value for the RF signal has increased from the value one previous, an addition results value from the addition circuit 115 is selected for output.

According to the above description, when the RF signal minimum value is in the decreasing direction, the section maximum value detected as the value Bottom by the minimum value hold circuit 111 is outputted from the minimum value storage circuit 113. With regards to this, when the maximum value of the RF signal is in an increasing direction, a value (addition results value) that is a fixed value "β" added to the value Bottom outputted one time before is outputted as the value Bottom.

In other words, in this case, when the minimum value for the RF signal is in the increasing direction, a value that is increased at a fixed rate is adopted as the value Bottom outputted from the minimum value storage circuit 113.

The subtractor 117 takes the value Peak outputted by the maximum value storage circuit 108 and the value Bottom outputted from the minimum value storage circuit 113 as input, and subtracts the value Bottom from the value Peak. The value calculated in this manner is then outputted to a defect determination circuit 119 as the value Peak-Bottom shown in the drawings.

Detection of a defect status is then carried out at the defect determination circuit 119 by comparing the value Peak-Bottom input by the subtractor 117 and a defect threshold value 118 shown in the drawings.

Such defect determination circuit 119 outputs an "H" level as the signal DEFECT shown in the drawings in accordance with, for example, the value Peak-Bottom becoming less than the value of the defect threshold value 118.

The operation obtained for the defect detection circuit 100 of the related art with the aforementioned configuration is described using FIG. 11, FIG. 12A and FIG. 12B.

First, a view illustrating a case where the amplitude levels of both the maximum value side and the minimum value side are small is shown in FIG. 11 for the operation obtained at the defect detection circuit 100.

In FIG. 11, first, the section maximum value detected by the maximum value hold circuit 106 shown in FIG. 10 also reduces due to the amplitude level of the maximum value side of the RF signal becoming smaller, as shown in the drawings.

As a result, at the maximum value comparator circuit 9, it is determined that the section maximum value currently held at the maximum value hold circuit 106 is smaller than the value Peak, and a comparison results signal for selectively outputting the subtraction results value from the subtraction circuit 110 is taken as input at the maximum value selector 107.

In accompaniment with this, the subtraction results value is outputted from the maximum value selector 107, with this subtraction results value being outputted even if the value Peak is outputted from the maximum value storage circuit 108.

However, as described previously, in the case where the maximum value for the RF signal is in the reducing direction (the amplitude level of the maximum value side of the RF signal is becoming small), a value that is the value Peak outputted one time before with the fixed value "α" subtracted is output as the value Peak.

Here, by outputting a value that is the value Peak outputted one time before with the fixed value "α" subtracted, the value Peak as shown in the drawings reduces with a fixed inclination corresponding to the fixed value "α".

In other words, the value Peak in this case reduces with a fixed inclination according to the fixed value "α" a regardless of reduction in width of the one previous maximum value (a value Peak output corresponding to the detection section for one previous) to the next detected section maximum value.

In the case where the amplitude level of the maximum value side of the RF signal is in a direction of becoming smaller as described above, this value Peak gently follows the maximum value level of the actual RF signal as shown in the drawings.

When the maximum value of the RF signal is in an increasing direction as described previously, the section maximum value detected by the maximum value hold circuit 106 is outputted as this value Peak. As a result, when the maximum value of the RF signal is in the increasing direction as shown in the drawings (when the amplitude level of the maximum value side of the RF signal is in a direction of becoming larger), this value Peak substantially follows fluctuations in the maximum value level of the RF signal.

Further, in FIG. 11, the section minimum value detected by the minimum value hold circuit 111 shown in FIG. 10 increases due to the amplitude level on the RF signal minimum value side becoming smaller.

As a result, it is determined at the minimum value comparator circuit 114 that the value Bottom is larger than the section minimum value held at the minimum value hold circuit 111, and a comparison results signal for selectively outputting addition results values from the addition circuit 115 is input to the minimum value selector 112.

In accompaniment with this, the subtraction results value is selectively outputted from the minimum value selector 112, with this addition results value being outputted even if the value Bottom is outputted from the minimum value storage circuit 113.

That is to say, in the case where the minimum value for the RF signal is in the increasing direction (the amplitude level of the minimum value side of the RF signal is becoming small), a value that is the value Bottom outputted one time before with a fixed value "β" added is output as the value Bottom.

Here, by outputting a value that is the value Bottom outputted one time before with the fixed value "β" added, the value Bottom as shown in the drawings increases with a fixed inclination corresponding to the fixed value "β".

In other words, the value Bottom in this case increases with a fixed inclination corresponding to the fixed value "β" regardless of increase in width of the one previous minimum value (a value Bottom output corresponding to the detection section for one previous) to the next detected section minimum value.

Therefore, in this case also, the value Bottom gradually follows the minimum value level of the actual RF signal as shown in the drawings in the case where the amplitude level of the minimum value side of the RF signal is in a direction of becoming smaller (in the case of a direction where the minimum value increases).

When the minimum value of the RF signal is in a decreasing direction as described previously, the section minimum value detected by the minimum value hold circuit 111 is outputted as the value Bottom. As a result, when the minimum value of the RF signal is in the decreasing direction as shown in the drawings (when the amplitude level of the minimum value side of the RF signal is in a direction of becoming larger), this value Bottom substantially follows fluctuations in the minimum value level of the actual RF signal.

The value Peak and the value Bottom generated in this manner are supplied to the subtractor 117 described previously in FIG. 10 and the value Bottom is subtracted from the value Peak so as to give a value Peak-Bottom indicating the amplitude level of the RF signal shown in the drawings.

In cases where this value Peak-Bottom falls below the value set at the defect threshold value 118 shown in the drawings, an "H" level is outputted as the signal DEFECT by the defect determination circuit 119 (DEFECT detection period in the drawings). That is, when the value Peak-Bottom falls below the defect threshold value in this way, this corresponds to the amplitude of the RF signal being of an order of smallness to assume a defect status, and a defect status can then be detected.

Continuing on, an example of a defect detection operation occurring at the defect detection circuit 100 obtained corresponding to the case where the amplitude level of just one side of the RF signal becomes small is shown in FIG. 12A and FIG. 12B.

Of FIG. 12A and FIG. 12B, FIG. 12A is a view illustrating a case where only the amplitude level of the maximum value side of the RF signal becomes small.

First, in this case, the level of the value Bottom as shown in the drawings is taken to be substantially fixed because there is no fluctuation in the amplitude level of the minimum value side of the RF signal. In other words, in this case, only the value Peak fluctuates according to fluctuations in the amplitude level of the maximum value side of the RF signal and Peak-Bottom therefore makes substantially the same transition as the value Peak as shown in the drawings.

Fluctuation in the level of the value Peak-Bottom in this case therefore depends on change in the level of the value Peak and reduces with an inclination corresponding to the fixed value "α".

A defect status is therefore detected (DEFECT detection period in the drawings) according to the reducing value Peak-Bottom falling below the defect threshold value shown in the drawing.

FIG. 12B is a view illustrating a case where only the amplitude level of the maximum value side of the RF signal becomes small.

In this case, contrary to the case of FIG. 12A, only the amplitude level of the minimum value side of the RF signal fluctuates, and the value Peak-Bottom therefore reduces at substantially the same width as the increase in width of the value Bottom.

In other words, the value Peak-Bottom in this case reduces with an inclination corresponding to the fixed value "β".

In this case also, a defect status is therefore detected (DEFECT detection period in the drawings) according to the reducing value Peak-Bottom falling below the defect threshold value shown in the drawing.

As can be understood from the above description, at the defect detection circuit 100 of the related art, fall in the amplitude level of the maximum value side of the RF signal gently follows falls in the amplitude level of the maximum value side of the RF signal due to the value Peak falling at a rate of reduction corresponding to the fixed value "α". Further, gradual following is possible even for falls in the amplitude level of the minimum value side of the RF signal by increasing the value Bottom at a rate of increase corresponding to the fixed value "β".

In addition, it is possible for this value Peak-Bottom to be made to gradually follow falls in the amplitude level of the actual RF signal by subtracting the value Bottom from the value Peak to obtain a value Peak-Bottom indicating the amplitude level of the RF signal.

Here, at the defect detection circuit 100 of the related art, when amplitude levels at both the maximum value side and the minimum value side of the RF signal shown previously in FIG. 11 are becoming small, falling in the amplitude level of the RF signal can be followed from both the maximum value side and the minimum value side due to the value Peak decreasing and the value Bottom increasing.

It is therefore possible for the value Peak-Bottom in this case to follow in a manner substantially corresponding to a fall in the amplitude level of the actual RF and it is possible to detect defect statuses in a comparatively accurate manner.

However, when the amplitude level of the RF signal becomes small wholly on one of the sides as shown in FIG. 12A and FIG. 12B, then this fall in the amplitude level can only be followed by one of either the maximum value side or the minimum value side and the value Peak-Bottom in this case reduces with a fixed inclination corresponding to fixed value "α" or fixed value "β". That is, as can be understood from comparison with the case of FIG. 11, the value Peak-Bottom cannot follow in a manner corresponding with fall in the amplitude level of the actual RF signal.

Because of this, according to the defect detection circuit 100 of the related art, the defect detection timing becomes markedly slow compared with the case in FIG. 11 in cases where the amplitude level of the RF signal becomes small alone on one side. It is therefore not possible to accurately carry out detection of defect statuses in a manner corresponding with the amplitude level of an actual RF signal becoming smaller.

DISCLOSURE OF THE INVENTION

In order to resolve the aforementioned problems, in the present invention, a defect detection apparatus is given the following configuration.

In other words, first, maximum value detection means for obtaining a detection maximum value by detecting a maximum value of an RF signal obtained by an operation of reading out a signal from a recording medium; and minimum value detection means for obtaining a detection minimum value by detecting a minimum value of the RF signal are provided, as are maximum value output means for obtaining a subtraction results value for subtracting a required subtraction value from the detection maximum value when the detection maximum value obtained by the maximum value detection means is taken to be in a reducing direction, and outputting the subtraction results value as a maximum value of the RF signal; and minimum value output means for obtaining an addition results value for adding a required addition value to the detection minimum value when the detection minimum value obtained by the minimum value detection means is taken to be in an increasing direction, and outputting the addition results value as a minimum value of the RF signal.

Amplitude level calculating means for calculating an RF amplitude value indicating an amplitude level of the RF signal by subtracting a minimum value outputted by the minimum value output means from a maximum value outputted by the maximum value output means, and defect detection means for detecting a defect status by comparing an RF amplitude value calculated by the amplitude level calculating means and a prescribed threshold value are also provided.

Center value calculating means for calculating a center value of an amplitude of the RF signal based on a detection maximum value obtained by the maximum value detection means and a detection minimum value obtained by the minimum value detection means; and variable value setting means for variably setting the subtraction value occurring at the maximum value output means and the addition value occurring at the minimum value output means according to the level of the center value calculated by the center value calculating means, are further provided.

Further, in the present invention, the defect detection method is implemented as follows.

In other words, first, a maximum value detection process of obtaining a detection maximum value by detecting a maximum value of an RF signal obtained by an operation of reading out a signal from a recording medium; and a minimum value detection process of obtaining a detection minimum value by detecting a minimum value of the RF signal are executed, as are a maximum value output process of obtaining a subtraction results value for subtracting a required subtraction value from the detection maximum value when the detection maximum value obtained by the maximum value detection process is taken to be in a reducing direction, and outputting the subtraction results value as a maximum value of the RF signal, and a minimum value output process of obtaining an addition results value for adding a required addition value to the detection minimum value when the detection minimum value obtained by the minimum value detection process is taken to be in an increasing direction, and outputting the addition results value as a minimum value of the RF signal.

An amplitude level calculating process of calculating an RF amplitude value indicating an amplitude level of the RF signal by subtracting a minimum value outputted by the minimum value output process from a maximum value outputted by the maximum value output process; and a defect detection process of detecting a defect status by comparing an RF amplitude value calculated by the amplitude level calculating process and a prescribed threshold value are also executed, as are a center value calculating process of calculating a center value of an amplitude of the RF signal based on a detection maximum value obtained by the maximum value detection process and a detection minimum value obtained by the minimum value detection means, and a variable value setting process of variably setting the subtraction value subtracted by the maximum value output process and the addition value added by the minimum value output process according to the level of the center value calculated by the center value calculating process.

According to the present invention, in cases where a center value for the amplitude of an RF signal calculated in the above manner increases or decreases in excess of the prescribed level, and the amplitude level of an RF signal becomes smaller alone on the maximum value side or the minimum value side, the subtraction values or the addition values are varied accordingly.

If, for example, the variably set subtraction value or the addition value become values that are larger than normal, the reduction width of the maximum value or the width of increase of the minimum value becomes larger than normal in accompaniment with the amplitude level of the RF signal becoming smaller. That is, in accompaniment with this, reduction width becomes larger even for an RF amplitude value calculated from the maximum value and the minimum value.

As a result, according to the present invention, when the amplitude level of the RF signal becomes smaller alone on the maximum value side or the minimum value side, it is possible for the RF amplitude value to be made to follow this tendency of the amplitude level to fall.

BRIEF DESCRIPTION OF DRAWINGS

FIG. 8 is a view illustrating a comparison of an operation obtained for a defect detection apparatus given as the embodiment with the related art.

BEST MODE FOR CARRYING OUT THE INVENTION

The following is a description of an embodiment of a defect detection apparatus of the present invention given for examples of cases applied to a disc playback apparatus capable of playing back digital data recorded on a disc recording medium.

Figure 1:
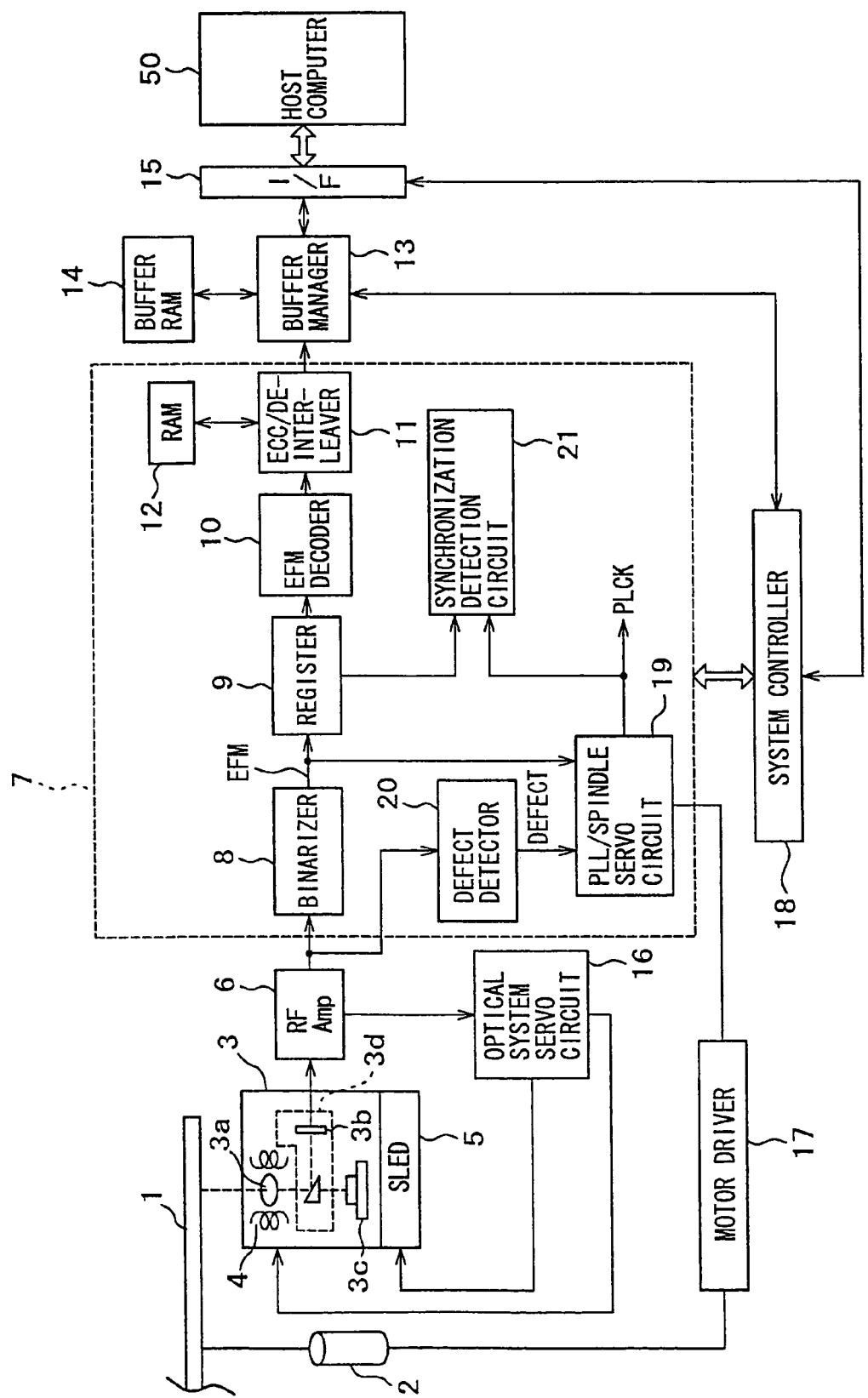
FIG. 1 is a block diagram showing an example of an internal configuration for a disc playback apparatus to which an embodiment of a defect detection apparatus of the present invention is applied.

FIG. 1 shows a configuration of a disc playback apparatus O to which a defect detection apparatus is applied as an embodiment of the present invention. The disc playback apparatus O shown in this drawing adopts a configuration capable of reproducing data compatible with CD (Compact Disc) format optical discs such as, for example, CD, CD-ROM, CD-R (Recordable), and CD-RW (Re-Writable) etc.

In this drawing, a disc 1 is rotatably driven by a spindle motor 2 at a Constant Linear Velocity (CVL) during playback operations. Reading of pit data recorded on tracks on the disc 1 can then be carried out by an optical head 3.

In order to carry out the aforementioned operation of reading data from the disc 1, the optical head 3 is equipped with an optical system 3$d$ constituted by a laser diode 3$c$ for providing a laser output and a polarized beam splitter and ¼ wave plate etc., an objective lens 3$a$ constituting a laser output terminal, and a detector 3$b$ for detecting reflected light.

The objective lens 3$a$ is supported in a manner capable of movement by a two-axial mechanism 4 in a radial direction (tracking direction) of the disc and direction towards and away from the disc. Further, the whole of the optical head 3 is capable of being moved in a radial direction of the disc by a thread mechanism 5.

Information detected from the disc 1 is supplied to an RF amplifier 6 by a playback operation of the optical head 3. In this case, at the RF amplifier 6, a playback RF signal, tracking error signal, and focus error signal etc. are obtained by subjecting inputted information to amplification processing and required arithmetic processing etc.

The defect (DEFECT) detector 20 compares amplitude level of the playback RF signal provided by the RF amplifier 6 and an internally set threshold value, and detects when the amplitude level of the RF signal is less than the threshold value. Further, together with this, the defect detection circuit 20 supplies a signal corresponding to the detection results as a signal DEFECT shown in the drawings to each of the necessary parts such as, for example, the PLL/spindle servo circuit 19 described later, etc.

The defect detection circuit 20 then notifies each of the necessary parts of detection of a defect status by outputting the signal DEFECT as, for example, an "H" level, in accordance with detection that the amplitude level of the playback RF signal is less than the threshold value.

The internal configuration of the defect detection circuit 20 is described later.

At an optical system servo circuit 16, each of the various servo drive signals are generated based on a tracking error signal and focusing error signal supplied from the RF amplifier 6 and a track jump instruction and access instruction etc. from the system controller 18. The two-axial mechanism 4 and the thread mechanism 5 are then controlled and focusing and tracking control is carried out.

Further, by providing the playback RF signal obtained at the RF amplifier 6 to a binarizer 8 within a signal processor 7 shown in the drawings, output of a so-called EFM signal format recording encoded using an EFM method (⁸/₁₄ modulation) is achieved, and is provided to a register 9 and PLL/spindle servo circuit 19 shown in the drawings.

Further, the tracking error signal and focusing error signal are supplied to the optical system servo circuit 16.

The EFM signal supplied to an EFM decoder 10 via the register 9 from the binarizer 8 is then demodulated.

This EFM decoder 10 executes demodulation processing of the inputted EFM signal at a timing according to a playback sync outputted from a synchronization detection circuit 21 described later and PLCK provided by a PLL spindle servo circuit 19 shown in the drawings.

Data EFM-demodulated by the EFM decoder 10 is supplied to an ECC/de-interleaving processing circuit 11. At the ECC/de-interleaving processing circuit 11, error correction processing and de-interleaving processing is executed while writing and reading data to and from the RAM 12 at prescribed timings. Data that has been subjected to error correction processing and de-interleaving processing by the ECC/de-interleaving processing circuit 11 is then supplied to a buffer manager 13 described later.

At a PLL/spindle servo circuit 19, a signal PLCK taken as a playback clock synchronized with the EFM signal is outputted by taking the EFM signal supplied from the binarizer 8 as input so as to cause the PLL circuit to operate. This signal PLCK then constitutes a reference clock for processing within the signal processor 7. Operation timing of the signal processing system of the signal processor 7 therefore follows the rotational speed of the spindle motor 2.

In this case, a signal DEFECT from the defect detection circuit 20 is supplied to the PLL/spindle servo circuit 19 as described above. The frequency of the signal PLCK is then fixed to the frequency of a VCO while a "H" level is being supplied as the signal DEFECT.

In other words, stable clock playback can be achieved by not carrying out clock playback based on the inputted EFM signal in the period for which a defect status is detected in this manner.

A motor driver 17 generates a motor drive signal based on, for example, a spindle servo control signal supplied by the PLL/spindle servo circuit 19 and supplies this to the spindle motor 2. In this way, the spindle motor 2 rotatably drives the disc in such a manner as to obtain an appropriate rotational speed in accordance with a prescribed rotation control method.

At the synchronization detection circuit 21, an operation in order to detect frame sync (a frame synchronization signal) from the EFM signal supplied via the register 9 is carried out taking the signal PLCK inputted from the PLL/spindle servo circuit 19 as a reference clock.

Further, at this synchronization detection circuit 21, as there are cases where a sync pattern drops out in data due to the influence of drop-out and jitter or cases where the same sync pattern is detected, processing such as interpolation processing and window preservation etc. is also executed for the frame sync.

Data outputted from the ECC/de-interleaving processing circuit 11 of the signal processor 7 is supplied to a buffer manager 13.

Memory control is executed at the buffer manager 13 in order to temporarily store supplied playback data in a buffer RAM 14. Data buffered in the buffer RAM 14 is read-out, transferred, and outputted as playback output from the disc playback apparatus O.

An interface 15 connects with an external host computer 50, with communication such as playing back of data data and various commands taking place with the host computer 50.

In this case, the buffer manager 13 reads out the required amount from playback data temporarily stored in the buffer RAM 14 and transfers this to the interface 15. Transferred playback data is then subjected to processing such as, for example, putting into packets etc. in accordance with a prescribed data interface format at the interface 15 and is transmitted out to the host computer 50.

Read commands, write commands and other signals are supplied from the host computer 50 to the system controller 18 via the interface 15.

The system controller 18 is equipped with a microcomputer etc., for executing appropriate control processing according to operations required to be executed by each functional circuit part constituting the playback apparatus.

In FIG. 1, it is taken that the disc playback apparatus O is connected to the host computer 50 but it is also possible for the playback apparatus to which the defect detection apparatus of the present invention is applied to not be connected to the host computer 50, etc. In this case, the providing of operation parts and display parts and the configuration of data input/output interface parts is different to FIG. 1. That is, it is preferable for playback to be carried out according to user operations and for terminals for input/output of various data to be formed.

Here, an internal configuration for the defect detection circuit 20 described above is shown as a block diagram in FIG. 2.

First, at the defect detection circuit 20, a playback RF signal provided by the RF amplifier 6 shown in FIG. 1 is converted to digital data by an A/D converter 25 shown in the drawing, and is supplied to a maximum value hold circuit 26 and a minimum value hold circuit 31.

The maximum value hold circuit 26 detects maximum values for fixed sections of the RF signal supplied by the A/D converter 25 and holds detected maximum values as section maximum values. These held section maximum values are then outputted to a maximum value selector 27, a maximum value comparator circuit 29, and a center value detection circuit 36 at prescribed timings.

A section maximum value outputted by the maximum value hold circuit 26 and a subtraction results value outputted by a subtraction circuit 30 described later are inputted to the maximum value selector 27. Further, together with this, a comparison results signal from the maximum value comparator circuit 29 described later is also input to the maximum value selector 27.

The maximum value selector 27 then selectively outputs one of the inputted section maximum value and the subtraction results value to a maximum value storage circuit 28 according to the comparison results signal inputted by the maximum value comparator circuit 29.

The maximum value storage circuit 28 then takes as input and stores the section maximum value or the subtraction results value outputted by the maximum value selector 27. By outputting values stored in this manner at a prescribed timing, the stored section maximum value or subtraction results value is output to a subtractor 37 as a value Peak shown in the drawings. Further, the value Peak outputted by the maximum value storage circuit 28 in this manner is also provided to the maximum value comparator circuit 29 and the subtraction circuit 30.

A value "αA" or a value "αB" is input as a subtraction value to the subtraction circuit 30 from the center value detection circuit 36 shown in the drawings.

This subtraction circuit 30 carries out subtraction processing on the value Peak inputted by the maximum value storage circuit 28 according to subtraction values inputted by the center value detection circuit 36 as described above. In other words, subtraction processing expressed by "Peak- αA" is carried out in the case where value αA is inputted by the center value detection circuit 36. Further, operation processing expressed by "Peak-αB" is carried out in the case where value αB is inputted by the center value detection circuit 36.

The subtraction circuit 30 then outputs values calculated by these subtraction processes to the maximum value selector 27 as subtraction result values.

The maximum value comparator circuit 29 compares the value Peak provided by the maximum value storage circuit 28 and the section maximum value provided by the maximum value hold circuit 26 described previously. In other words, a section maximum value (current maximum value) detected at a current detection section at the maximum value hold circuit 26 and the value Peak (maximum value for one time before) outputted by the maximum value storage circuit 28 corresponding to one detection section previous as viewed from this current detection section are compared at the maximum value comparator circuit 29. As a result of this, at the maximum value comparator circuit 29, it is possible to discriminate as to whether the current maximum value for the RF signal has increased or decreased with respect to one maximum value previous.

When it is determined that the section maximum value supplied by the maximum value hold circuit 26 is greater than the value Peak supplied by the maximum value storage circuit 28, the maximum value comparator circuit 29 outputs a comparison results signal for selectively outputting a section maximum value to the maximum value selector 27 described previously. In other words, when the current maximum value supplied by the maximum value hold circuit 26 is greater than the maximum value for one time previous provided by the maximum value storage circuit 28, the section maximum value held by the maximum value hold circuit 26 is selectively output as the value Peak.

On the other hand, when it is determined that the aforementioned section maximum value is smaller than the value Peak, the comparison results signal for selectively outputting the subtraction results value from the subtraction circuit 30 is outputted to the maximum value selector 27. In other words, when the current maximum value for the RF signal has decreased from the maximum value one previous, then the subtraction results value is selected for output from the subtraction circuit 30.

The minimum value hold circuit 31 detects minimum values for fixed sections of the RF signal supplied by the A/D converter 25 and holds detected minimum values as section minimum values. These held section minimum values are then outputted to a minimum value selector 32, a minimum value comparator circuit 34, and a center value detection circuit 36 at prescribed timings.

A section maximum value from the maximum value hold circuit 26 described previously and a section minimum value from the minimum value hold circuit 31 are inputted to the center value detection circuit 36.

This center value detection circuit 36 then calculates an RF center value indicating a center value of the amplitude of the RF signal from the section maximum value and the center minimum value. Switching over then takes place between the subtraction value α outputted to the subtraction circuit 30 described above and the addition value β outputted to the addition circuit 35 described later according to the level of the RF center value calculated in this manner, but this is described later.

A section minimum value outputted by the minimum value hold circuit 31 and an addition results value outputted by an addition circuit 35 described later are inputted to the minimum value selector 32. Further, a comparison results signal from the minimum value comparator circuit 34 described later is also input to the minimum value selector 32.

The minimum value selector 32 then selectively outputs one of the inputted section minimum value and the addition results value to a minimum value storage circuit 33 according to the comparison results signal inputted by the minimum value comparator circuit 34.

The minimum value storage circuit 33 then takes as input and stores the section minimum value or the addition results value outputted by the minimum value selector 32 as described above. By outputting values stored in this manner at a prescribed timing, the stored section minimum value or addition results value is output to the subtractor 37, the minimum value comparator circuit 34 and the addition circuit 35 as a value Bottom shown in the drawings.

A value "βA" or a value "βB" is input as an addition value to the addition circuit 35 from the aforementioned center value detection circuit 36.

This addition circuit 35 carries out addition processing on the value Bottom inputted by the minimum value storage circuit 33 as described above according to addition values inputted by the center value detection circuit 36 as described above. In other words, addition processing expressed by "Bottom+βA" is carried out in the case where value βA is inputted by the center value detection circuit 36. Further, addition processing expressed by "Bottom+βB" is carried out in the case where value βB is inputted by the center value detection circuit 36.

The addition circuit 35 then outputs values calculated by these addition processes to the maximum value selector 27 as addition result values.

The minimum value comparator circuit 34 compares the value Bottom provided by the minimum value storage circuit 33 and the section minimum value provided by the minimum value hold circuit 31 described previously. In other words, a section minimum value (current minimum value) detected at a current detection section at the minimum value hold circuit 31 and the value Bottom (minimum value for one time before) outputted by the minimum value storage circuit 33 corresponding to one detection section previous as viewed from this current detection section are compared at the minimum value comparator circuit 34. As a result of this, at the minimum value comparator circuit 34, it is possible to discriminate as to whether the current minimum value for the RF signal has increased or decreased with respect to one minimum value previous.

When it is determined that the section minimum value supplied by the minimum value hold circuit 31 is less than the value Bottom supplied by the minimum value storage circuit 33, the minimum value comparator circuit 34 outputs a comparison results signal for selectively outputting a section minimum value to the minimum value selector 32 described previously. In other words, when the current minimum value supplied by the minimum value hold circuit 31 is less than the minimum value for one time previous provided by the minimum value storage circuit 33, the section maximum value held by the minimum value hold circuit 31 is selectively output as the value Bottom.

On the other hand, when it is determined that the aforementioned section minimum value is larger than the value Bottom, the comparison results signal for selectively outputting the addition results value from the addition circuit 35 is outputted to the minimum value selector 32. In other words, when the current minimum value for the RF signal has increased from the value one previous, an addition results value from the addition circuit 115 is selected for output.

The subtractor 37 takes the value Peak outputted by the maximum value storage circuit 28 and the value Bottom outputted from the minimum value storage circuit 33 as input, and subtracts the value Bottom from the value Peak. The value calculated in this manner is then outputted to a defect determination circuit 39 as the value Peak-Bottom shown in the drawings.

Detection of a defect status is then carried out at the defect determination circuit 39 by comparing the value Peak-Bottom input by the subtractor 37 and a value set as the defect threshold value 38 shown in the drawings.

This defect determination circuit 39 outputs an "H" level as the signal DEFECT shown in the drawings in accordance with, for example, the value Peak-Bottom becoming less than the value of the defect threshold value 38.

Next, an internal configuration for the center value detection circuit 36 described above is shown in FIG. 3.

Figure 3:
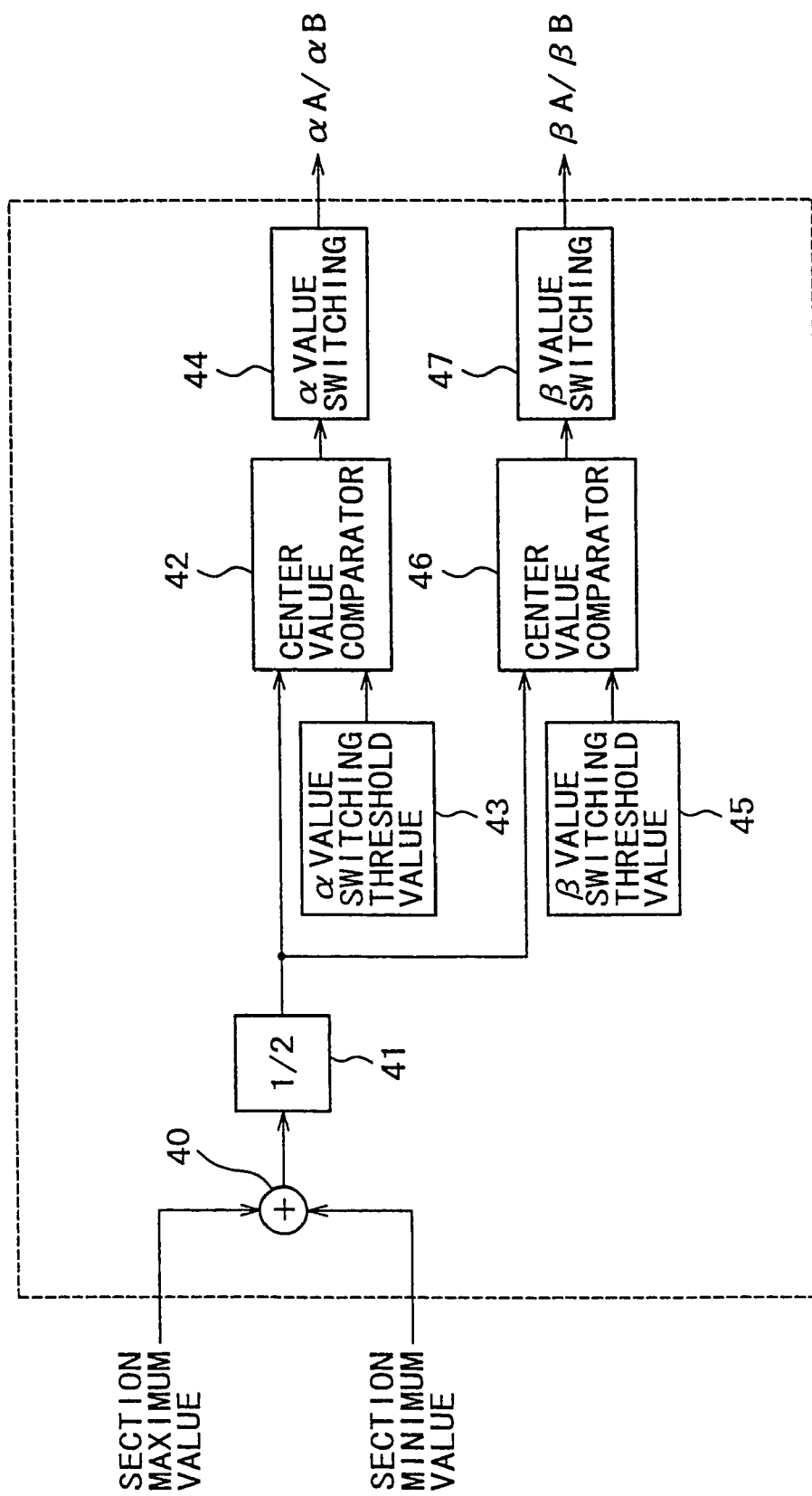
FIG. 3 is a block diagram showing an example configuration of an embodiment of a center value detection circuit configured within a defect detection apparatus.

In FIG. 3, the center value detection circuit 36 is configured having an adder 40, ½ operation circuit 41, center value comparator 42, α value switching threshold value 43, α value switching circuit 44, β value switching threshold value 45, center value comparator 46, and β value switching circuit 47, as shown in the drawings.

Figure 2:
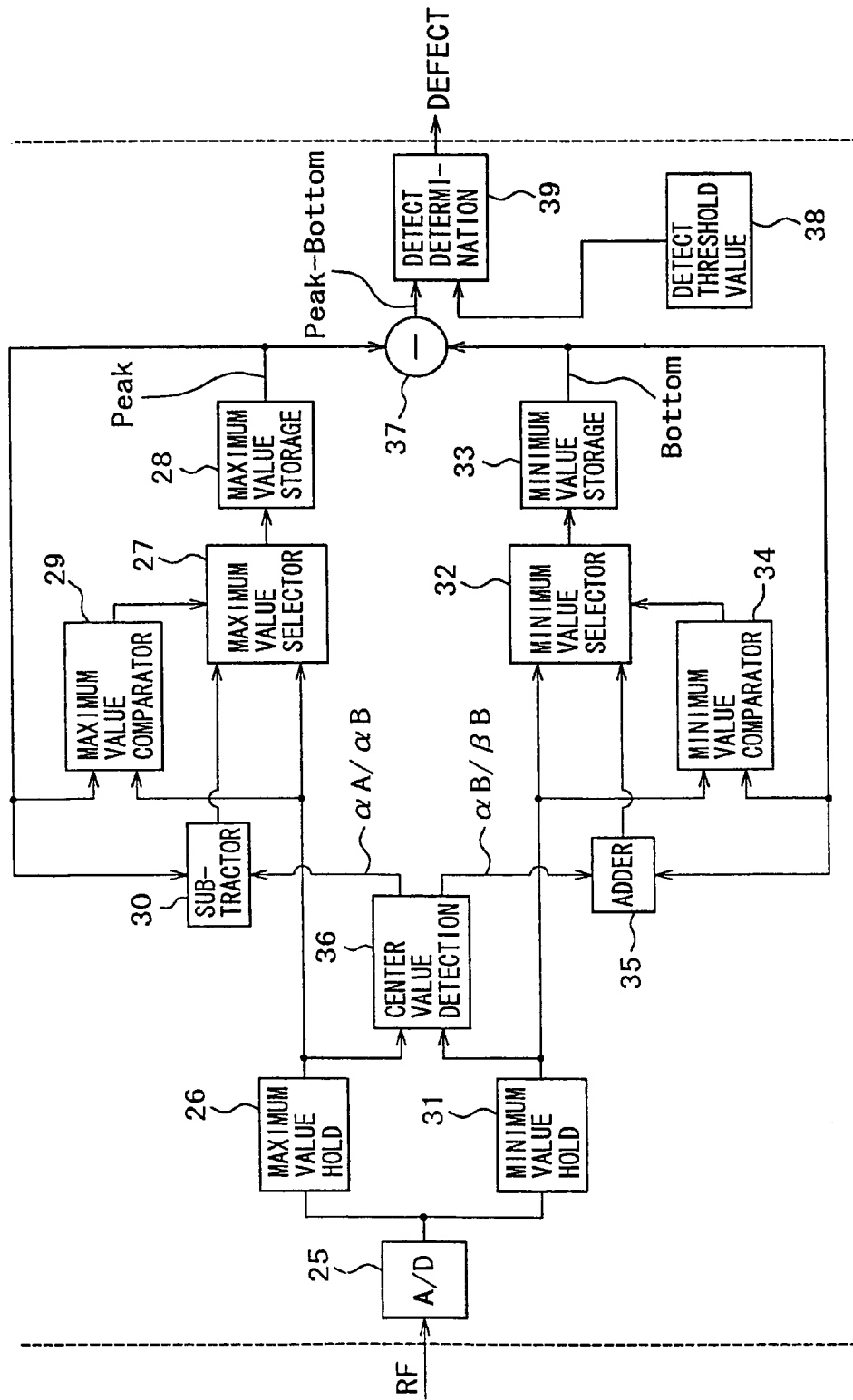
FIG. 2 is a block diagram showing an example of an internal configuration of an embodiment of a defect detection apparatus.

First, a section maximum value from the maximum value hold circuit 26 shown in FIG. 2 and a section minimum value from the minimum value hold circuit 31 are inputted to the adder 40 as shown in the drawings. The adder 40 then outputs a value that is the section maximum value and the section minimum value added together to the ½ operation circuit 41.

The ½ operation circuit 41 obtains an RF center value indicating the center value of amplitude of the RF signal by multiplying a value for the sum of the section maximum value and the section minimum value added by the adder 40 by ½.

At the ½ operation circuit 41, the RF center value obtained in the above manner is displayed using values of "0" to "255" in the case of executing A/D conversion processing using, for example, the eight bit A/D converter 25 shown in FIG. 2.

Figure 4A:
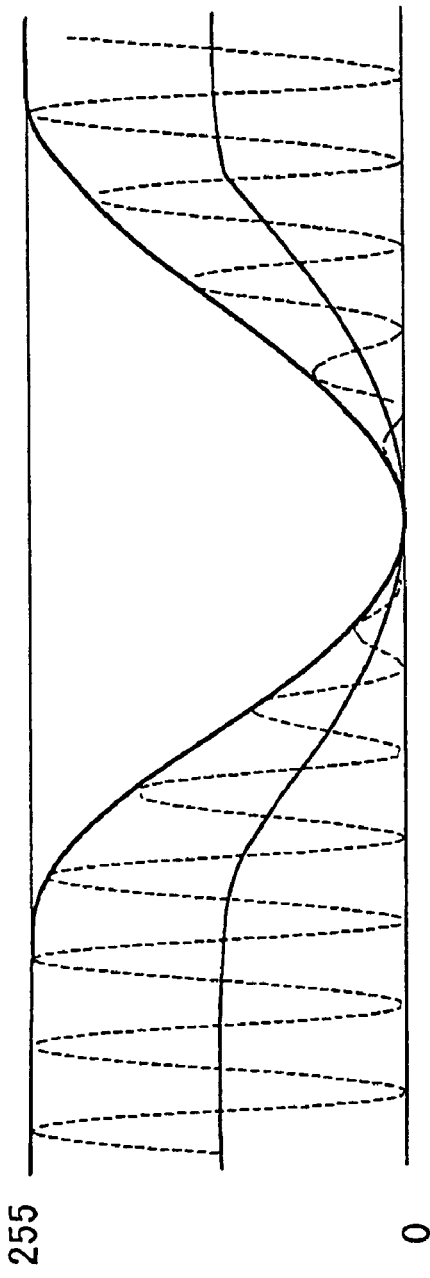
FIG. 4A is a view illustrating a case where amplitude level of an RF signal falls on a maximum value side.
Figure 4B:
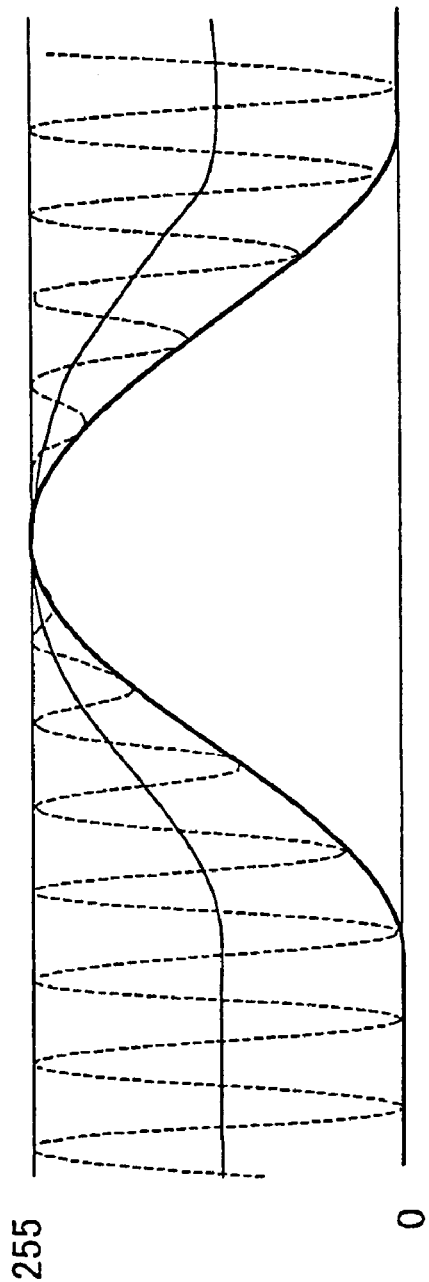
FIG. 4B is a view illustrating a case where amplitude level of an RF signal falls on a minimum value side.

The relationship between the RF center value obtained at the ½ operation circuit 41 and the amplitude of an actual RF signal is shown in FIG. 4A and FIG. 4B. However, when, for example, the values "0 to 255" are set during this time so that the "0" side indicates the minimum value of the RF signal, and the "255" side indicates the maximum value of the RF signal, for example, when the RF center value is on the "0" side, the actual RF signal is such that the amplitude level of the maximum value side alone becomes smaller as shown in FIG. 4A.

Further, with respect to this, when, for example, the center value is on the "255" side, the amplitude level of the minimum value side alone becomes smaller as shown in FIG. 4B.

Therefore, by referring to the RF center value obtained at the ½ operation circuit 41, it is possible to determine for the amplitude of the RF signal whether the amplitude level of the maximum value side alone is becoming smaller or whether the amplitude level of the minimum value side alone is becoming smaller.

At the ½ operation circuit 41, the RF center value obtained in the aforementioned manner is outputted to center value comparators 42 and 46 shown in the drawings.

By comparing the RF center value inputted by the ½ operation circuit 41 and the α value switching threshold value 43 shown in the drawing, the center value comparator 42 determines whether or not the RF center value exceeds this threshold value and is on the minimum value side alone, with a binary comparison results signal then being outputted to the α value switching circuit 44 according to the comparison results. In other words, at the center value comparator 42, a determination is made as to whether or not the amplitude level of the maximum value side of the RF signal exceeds a certain extent so as to become smaller alone.

When the center value comparator 42 determines together with this that the RF center value is smaller than the value of the α value switching threshold value 43 using the comparison results, and in other cases, comparison results signals for two different values are outputted to the α value switching circuit 44.

A prescribed value from "0" (minimum value side) of the values "0" to "255" is set as the α value switching threshold value 43 in this case to enable determination as to whether or not the RF center value is on the minimum value side.

The α value switching circuit 44 selectively outputs value "αA" or value "αB" to the subtraction circuit 30 shown in FIG. 2 according to a comparison results signal inputted by the center value comparator 42.

When the comparison results signal inputted by the center value comparator 42 shows that the RF center value is greater than the value of the α value switching threshold value 43, the α value switching circuit 44 outputs value "αA" to the subtraction circuit 30.

On the other hand, when the comparison results signal inputted by the center value comparator 42 shows that the RF center value is smaller than the value of the α value switching threshold value 43 (the amplitude level of the maximum value side of the RF signal exceeds a certain extent and becomes smaller alone), the value "αB" is outputted to the subtraction circuit 30.

At the α value switching circuit 44, the value "αA" and the value "αB" are both positive numbers, where "αA"<"αB". Therefore, in this case, when the amplitude level of the maximum value side of the RF signal exceeds a certain extent so as to become smaller alone, a value "αB" larger than the value "αA" is outputted as the subtraction value at the subtraction circuit 30.

By comparing the RF center value inputted by the ½ operation circuit 41 and the β value switching threshold value 45 shown in the drawing, the center value comparator 46 determines whether or not the RF center value exceeds this threshold value and is on the maximum value side, with a binary comparison results signal then being outputted to the β value switching circuit 47 according to the comparison results.

The center value comparator 46 determines whether or not the amplitude level of the minimum value side of the RF signal exceeds a certain extent so as to be becoming smaller alone by determining whether or not the RF center value exceeds the threshold value so as to be on the maximum value side alone.

When the center value comparator 46 determines together with this that the RF center value is larger than the value of the β value switching threshold value 45 using the comparison results, and in other cases, comparison results signals for two different values are outputted to the β value switching circuit 45.

A prescribed value from "255" (maximum value side) of the values "0" to "255" is set as the β value switching threshold value 45 in this case to enable determination as to whether or not the RF center value is on the maximum value side alone.

The β value switching circuit 47 selectively outputs value "βA" or value "βB" to the addition circuit 35 shown in FIG. 2 according to a comparison results signal inputted by the center value comparator 46.

When the comparison results signal inputted by the center value comparator 46 shows that the RF center value is less than the value of the β value switching threshold value 45, the β value switching circuit 47 outputs value "βA" to the addition circuit 35.

On the other hand, when the comparison results signal inputted by the center value comparator 46 shows that the RF center value is larger than the value of the β value switching threshold value 45 (the amplitude level of the minimum value side of the RF signal exceeds a certain extent and becomes smaller), the value "βB" is outputted to the addition circuit 35.

In this case also, the value "βA" and the value "βB" are positive numbers, and "βA"<"βB". Therefore, in this case, when the amplitude level of the minimum value side of the RF signal exceeds a certain extent so as to become smaller, a value "βB" larger than the value "βA" is outputted as the addition value at the addition circuit 35.

The operation obtained for the defect detection circuit 20 with the aforementioned configuration is described in the following using FIG. 5 to FIG. 6.

Figure 5:
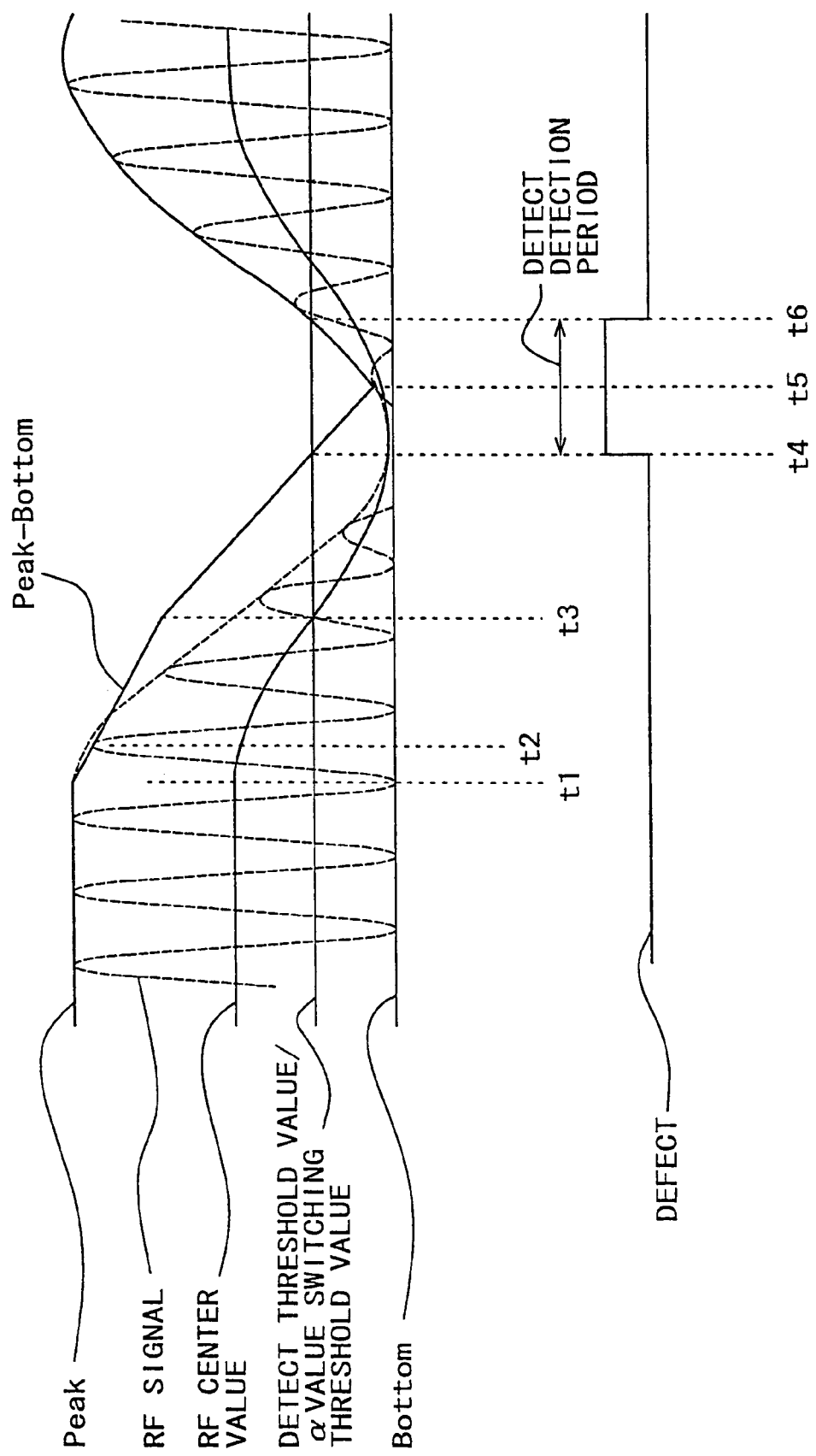
FIG. 5 is a view illustrating an operation obtained for a defect detection apparatus of the embodiment.

First, a description is given with reference to FIG. 5 of an operation obtained at the defect detection circuit 20 corresponding to the case where the amplitude level of the maximum value side of the RF signal becomes considerably and smaller than the minimum value side.

In the drawing, the value Peak and the value Bottom shown in the drawing represent values outputted by the maximum value storage circuit 28 and the minimum value storage circuit 33 described in FIG. 2, and for convenience of description, a case obtained with the value bottom at a fixed level is shown. In other words, in FIG. 5, for convenience of description, an example is given where the amplitude level on the minimum value side of the RF signal is fixed, and only the amplitude level on the maximum value side becomes substantially smaller.

Further, the value Peak-Bottom shown in the drawing is a value calculated by the subtractor 37 shown in FIG. 2 and as the value Bottom is fixed as described above in this case, this value changes with substantially the same value as the value Peak shown in the drawing.

The RF signal shows a signal generated by the RF amplifier 6 described in FIG. 1, and the RF center value shows a center value for the amplitude of the RF signal calculated by the ½ operation circuit 41 shown in FIG. 3.

The defect threshold value and the α value switching value are a value set at the defect threshold value 38 shown in FIG. 2 and a value set at the α value switching threshold value 43 shown in FIG. 3, respectively. The case where the defect threshold value and the α value switching threshold value are set to the same value as shown in the drawing is shown here.

Further, the signal DEFECT is a signal outputted by the defect determination circuit 39 shown in FIG. 2.

First, in FIG. 5, in the period before time t1 shown in the drawing, the amplitude level of the RF signal is substantially fixed at the maximum level for both the maximum value side and the minimum value side. As a result, in this period, the section maximum value and section minimum value detected by the maximum value hold circuit 26 and the minimum value hold circuit 31 respectively are outputted as the value Peak outputted by the maximum value storage circuit 28 and the value Bottom outputted by the minimum value storage circuit 33.

At a time t2 occurring after the time t1, only the amplitude level of the maximum value side of the RF signal becomes smaller, as shown in the drawings.

In doing so, in response to this, it is determined at the maximum value comparator circuit 29 shown in FIG. 2 that the section maximum value detected at this time t2 is smaller than the value Peak outputted one time before. In accompaniment with this, subtraction value results from the subtraction circuit 30 are selectively outputted at the maximum value selector 27.

In other words, from the time t2 onwards, subtraction result values selectively outputted in this manner are outputted as the value Peak via the maximum value storage circuit 28.

Further, together with this, at this time t2, as a result of just the amplitude level of the maximum value side of the RF signal becoming small as described above, even for the section maximum value detected by the maximum value hold circuit 26, this becomes smaller than the section maximum value occurring at time t. Moreover, in accompaniment with this, this value also reduces even for the RF center value obtained by the ½ operation circuit 41 of the center value detection circuit 36 described in FIG. 3.

In the period from time t2 to the time t3, the RF center value is in a state exceeding the value of the α value switching threshold value 43 as shown in the drawing. A comparison results signal indicating that the RF center value is greater than the value of the α value switching threshold value 43 is therefore outputted from the center value comparator 42 shown in FIG. 3 to the α value switching circuit 44. In response to this, at the α value switching circuit 44, the value "αA" is selectively outputted as the subtraction value for output to the subtraction circuit 30.

Because of this, at the period from this time t2 to time t3, a value that is the value "αA" subtracted from the value Peak for one time before is outputted as the comparison results value as the value Peak outputted by the maximum value storage circuit 28.

In other words, in this period, a value Peak-Bottom having a inclination corresponding to the value "αA" reduces.

Continuing on, at a time t3 occurring after the time t2, the RF center value falls below the α value switching threshold value.

In doing so, in response to this, conversely to the aforementioned case, a comparison results signal indicating that the RF center value is smaller (the amplitude level of the maximum value side of the RF signal alone is falling) than the value for the α value switching threshold value 43 is outputted from the center value comparator 42 to the α value switching circuit 44. In response to this, the α value switching circuit 44 selectively outputs the value "αB" that is larger than the value "αA" as the subtraction value outputted to the subtraction circuit 30.

Because of this, in the period from time t3 onwards, a value that is the value "αB" subtracted from the value Peak for one time before is outputted as the comparison results value as the value Peak outputted by the maximum value storage circuit 28.

In other words, the value Peak-Bottom outputted from the time t3 onwards reduces with a greater inclination (with a larger reduction width) as shown in the drawings than the inclination corresponding to the value "αA".

As a result, in the case where the RF center value falls below the α value switching threshold value 43 as described above and the amplitude level of the maximum value side of the RF signal exceeds a certain extent so as to become smaller, the value Peak-Bottom can be made to follow the falling inclination of the amplitude level of the actual RF signal more closely.

In this manner, at a time t4 in the drawing following the time t3 where the subtraction value a input to the subtraction circuit 30 is switched over from value "αA" to value "αB", the value Peak-Bottom shown in the drawings falls below the defect threshold value.

In doing so, at it is determined at the defect determination circuit 39 shown in FIG. 2 that the value Peak-Bottom inputted from the adder 37 has fallen below the defect threshold value 38. In response to this, a signal DEFECT constituted by an "H" level as shown in the drawings is outputted from the defect determination circuit 39.

Output of this "H" level signal DEFECT continues until time t6 where it is determined by the defect determination circuit 39 that the value Peak-Bottom has exceeded the defect threshold value. In other words, the period from the time t4 to the time t6 is taken to be a DEFECT period.

From time t5 in the drawing onwards, as the amplitude level of the maximum value side of the RF signal becomes large as shown in the drawings (the maximum value of the RF signal is in an increasing direction), the section maximum value detected by the maximum value hold circuit 26 is selectively outputted as the value Peak as described previously for FIG. 2. Because of this, the value Peak for the time t5 onwards substantially follows changes in the maximum value level of the RF signal while at the same time, the value Peak-Bottom increases so as to substantially follow changes in the maximum value level of the RF signal as shown in the drawing.

Figure 6:
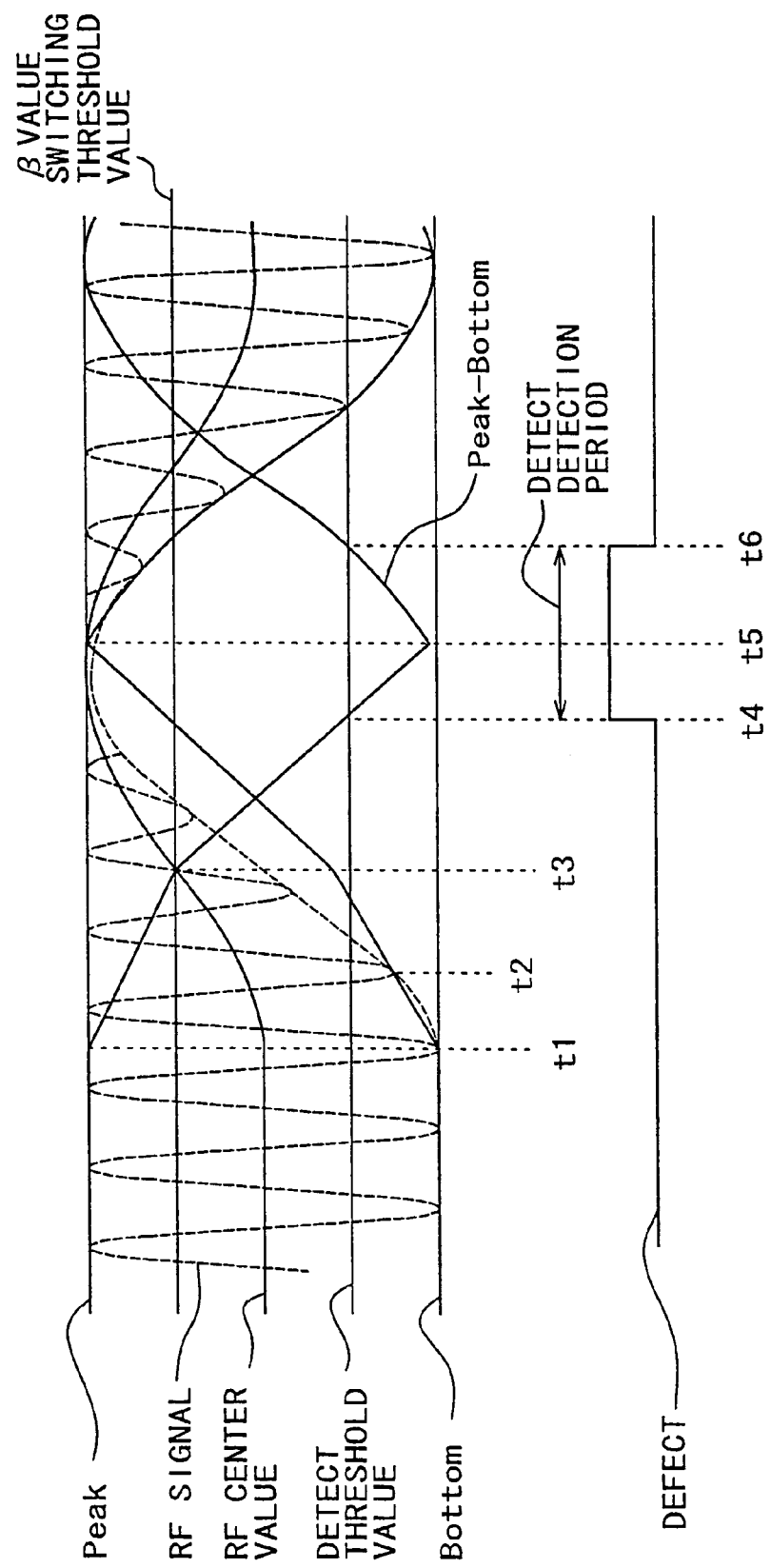
FIG. 6 is a view illustrating an operation obtained for a defect detection apparatus of the embodiment.

Next, a description is given with reference to FIG. 6 of an operation obtained at the defect detection circuit 20 corresponding to the case where the amplitude level of the minimum value side of the RF signal becomes considerably smaller than the maximum value side.

For convenience of description, an example is given in this drawing also of the case where amplitude level of the maximum value side of the RF signal is fixed, with only the amplitude level of the minimum value side becoming substantially smaller.

Further, in this drawing, the β value switching threshold value shown in the drawing is the value of the β value switching threshold value 45 shown in FIG. 3.

First, in FIG. 6, in the period before time t1 shown in the drawing, the amplitude level of the RF signal is substantially fixed at the maximum level for both the maximum value side and the minimum value side. As a result, for this period also, the section maximum value and section minimum value detected by the maximum value hold circuit 26 and the minimum value hold circuit 31 respectively are outputted as the value Peak outputted by the maximum value storage circuit 28 and the value Bottom outputted by the minimum value storage circuit 33.

At a time t2 occurring after the time t1, only the amplitude level of the minimum value side of the RF signal becomes smaller, as shown in the drawings.

In doing so, it is determined in this case by the minimum value comparator circuit 34 shown in FIG. 2 that the section minimum value detected at this time t2 is larger than the value Bottom outputted one time previous, and the addition results value from the addition circuit 35 are outputted as the value Bottom from the minimum value storage circuit 33.

Further, together with this, in this case, the section minimum value detected by the minimum value hold circuit 31, in accompaniment with the section minimum value occurring at time t1 becoming larger, increases, as does the RF center value obtained by the ½ operation circuit 41 of the center value detection circuit 36 shown in FIG. 3.

In the period from time t2 to the time t3, the RF center value has not yet fallen below the value of the β value switching threshold value 45, as shown in the drawing. A comparison results signal indicating that the RF center value is greater than the value of the β value switching threshold value 45 is therefore outputted from the center value comparator 46 shown in FIG. 3 to the β value switching circuit 47. In response to this, at the β value switching circuit 47, the value "βA" is selectively outputted as the addition value for output to the addition circuit 35.

Because of this, at the period from this time t2 to time t3, a value that is the value "βA" added to the value Bottom for one time before is outputted as the comparison results value for the value Bottom outputted by the minimum value storage circuit 33.

In other words, the value Peak-Bottom occurring at this period reduces at an inclination corresponding to this value "βA" in accompaniment with the value Bottom increasing at a width of increase corresponding to the value "βA" in this manner.

Continuing on, at a time t3 occurring after the time t2, the RF center value rises above the β value switching threshold value.

In doing so, in response to this, conversely to the aforementioned case, a comparison results signal indicating that the RF center value is larger (the amplitude level of the maximum value side of the RF signal alone is falling) than the value for the β value switching threshold value 45 is outputted from the center value comparator 46 to the β value switching circuit 47. In response to this, the β value switching circuit 47 selectively outputs the value "βA" that is larger than the value "βB" as the addition value outputted to the addition circuit 35.

Because of this, at the period from this time t3 onwards, a value that is the value "βB" added to the value Bottom for one time before is outputted as the comparison results value as the value Bottom outputted by the minimum value storage circuit 33.

In other words, the value Peak-Bottom outputted from the time t3 onwards reduces with a greater inclination (with a larger reduction width) as shown in the drawings than the inclination corresponding to the value "βA".

As a result, in the case where the RF center value rises above the β value switching threshold value 45 as described above and the amplitude level of the minimum value side of the RF signal falls, the value Peak-Bottom can be made to follow the falling inclination of the amplitude level of the actual RF signal more closely.

In this case, at time t4 following this time t3, when the value Peak-Bottom shown in the drawing falls below the defect threshold value, a signal DEFECT constituted by an "H" level is outputted by the defect determination circuit 39. The output of this "H" level signal DEFECT continues until it is determined at time t6 shown in the drawing that the value Peak-Bottom has exceeded the defect threshold value. The period from time t4 to time t6 is therefore the DEFECT detection period shown in the drawing.

Further, in this case also, from time t5 onwards in the drawings, the section minimum value detected by the minimum value hold circuit 31 is selectively outputted as the value Bottom in accompaniment with the amplitude level of the minimum value side of the RF signal becoming larger as shown in the drawings (the minimum value for the RF signal is in a reducing direction). Because of this, in this case also, the value Bottom for the time t5 onwards substantially follows changes in the minimum value level of the RF signal while in accompaniment with this, the value Peak-Bottom increases so as to substantially follow changes in the amplitude level of the RF signal.

Figure 7:
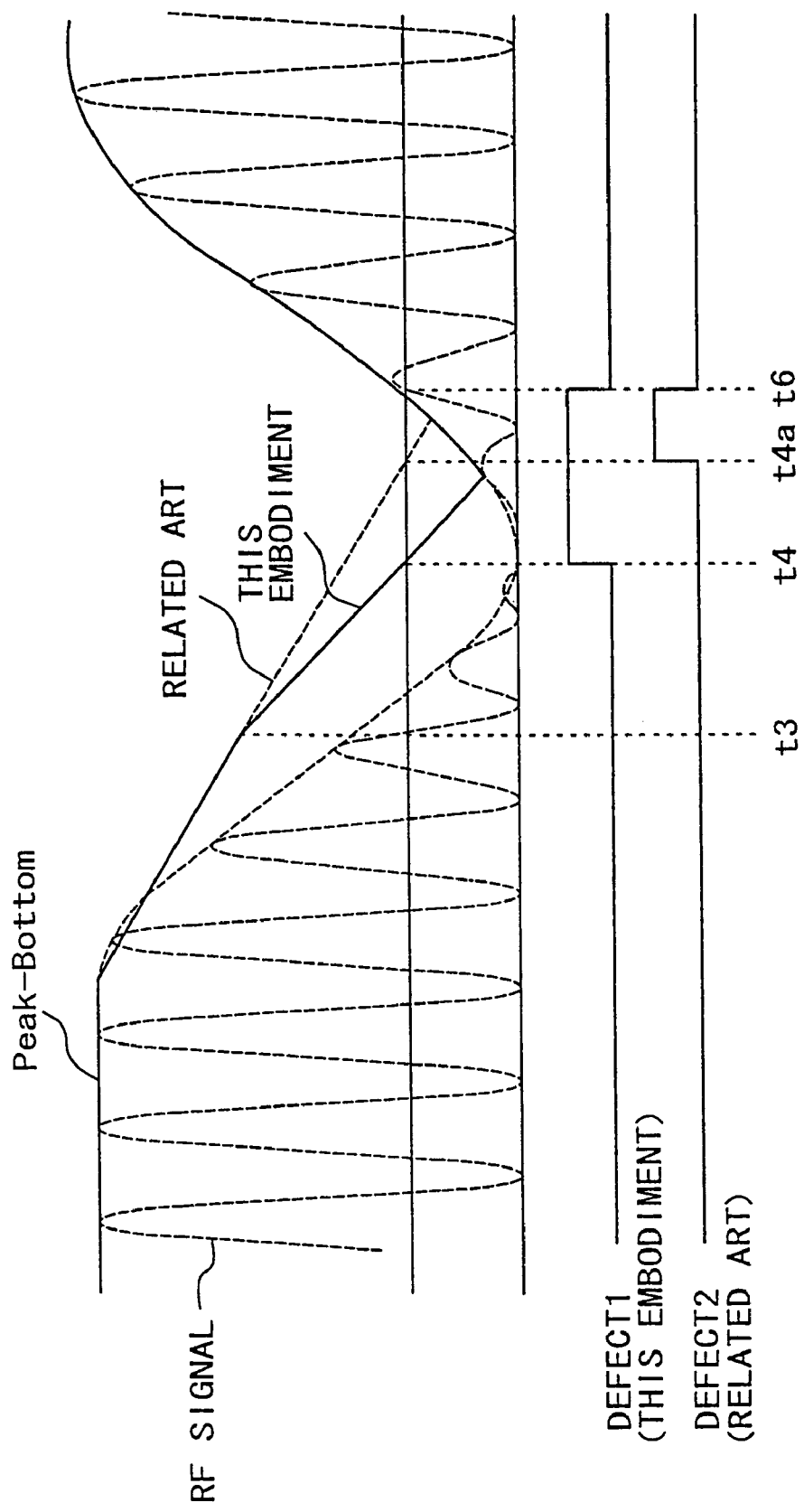
FIG. 7 is a view illustrating a comparison of an operation obtained for a defect detection apparatus given as the embodiment with the related art.
Figure 10:
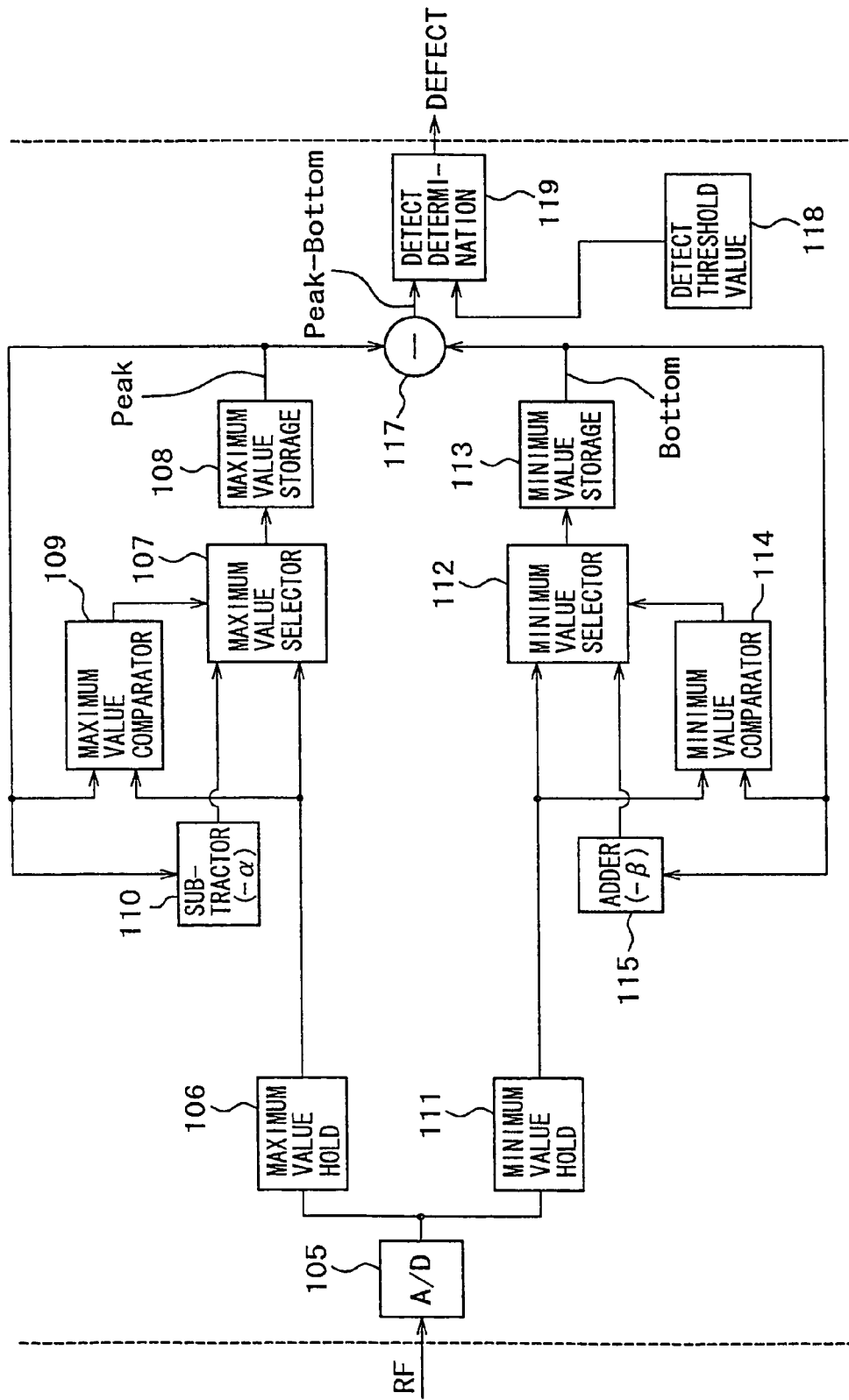
FIG. 10 is a block diagram showing an internal configuration of a defect detection apparatus of the related art.
Figure 11:
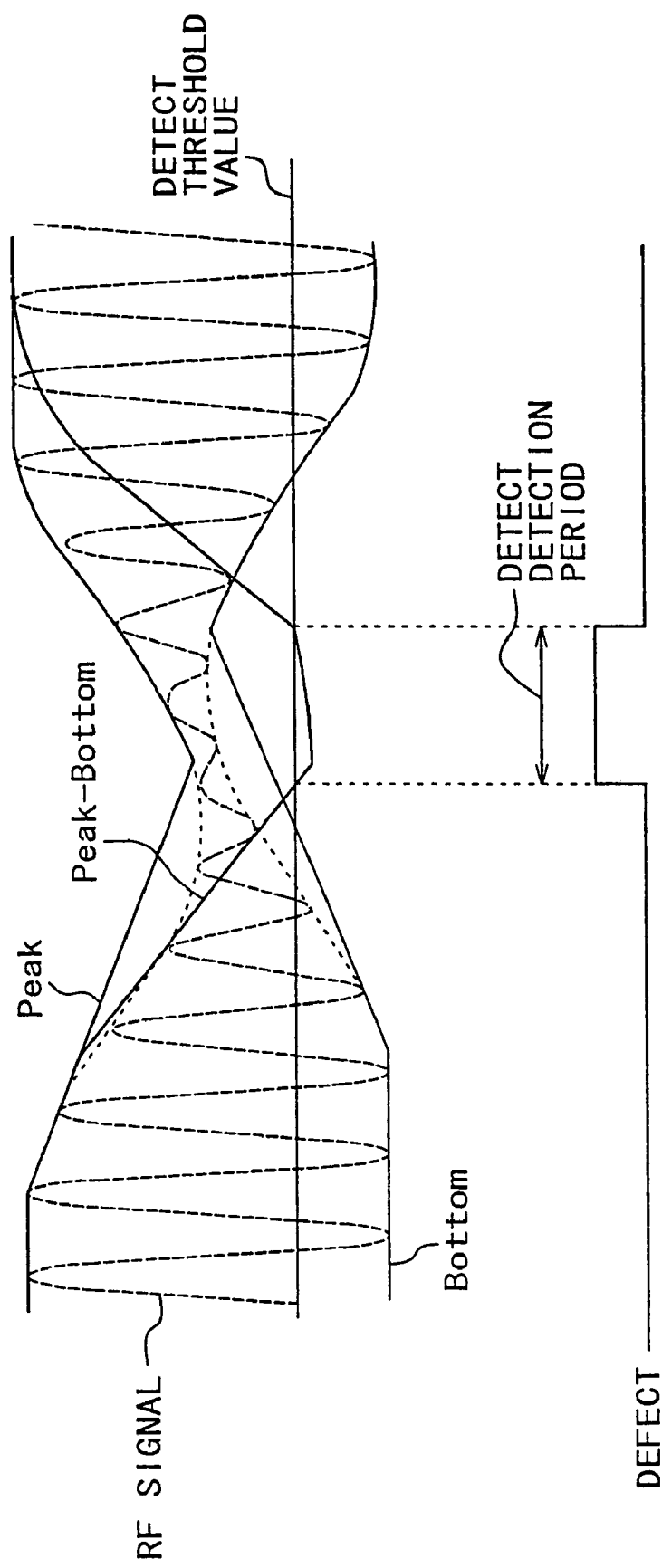
FIG. 11 is a view illustrating an operation obtained for a defect detection apparatus of the related art.
Figure 12A:
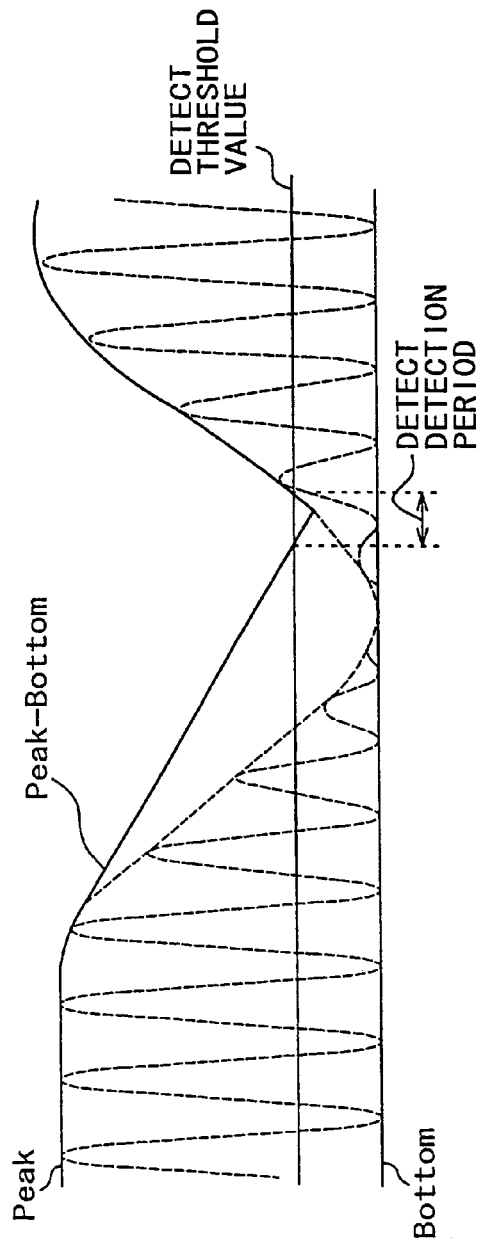
FIG. 12A and FIG. 12B are views illustrating an operation obtained for a defect detection apparatus of the related art.
Figure 12B:
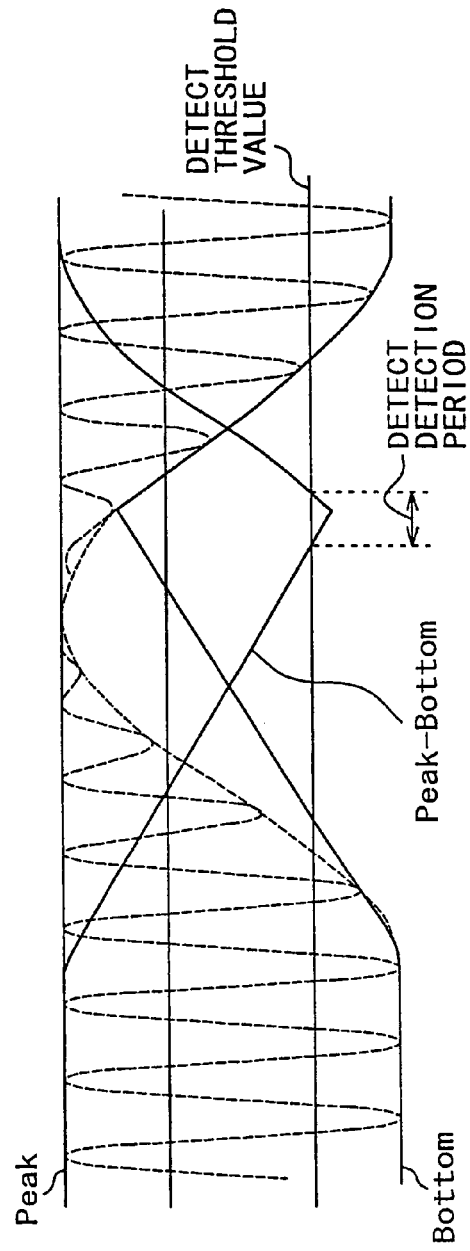

Here, the operation obtained at the defect detection circuit 20 of the preferred embodiment and the operation of the defect detection circuit 100 of the related art shown previously in FIG. 10 are compared using FIG. 7 and FIG. 8.

First, a view comparing the operations obtained for the defect detection circuit 20 and the defect detection circuit 100 in the case of obtaining the same RF signal as for the case of FIG. 5 previously is shown in FIG. 7.

In this drawing, at the defect detection circuit 100 of the related art described previously, when the maximum value of the RF signal is in the reducing direction as shown in the drawing, the value Peak-Bottom reduces at a reduction width corresponding to the fixed value "α".

Therefore, when only the amplitude level of the maximum value side of the RF signal becomes small at the defect detection circuit 100 of the related art, it is not possible for the value Peak-Bottom to reduce at a fixed inclination, and it was also not possible for the value Peak-Bottom to follow along the falling inclination of the amplitude level of the actual RF signal.

With regards to this, with the defect detection circuit 20 of the preferred embodiment of the present invention, as described previously, at the time t3 shown in the drawing, the inclination of the value Peak-Bottom changes from being according to the value "αA" to being according to the value "αB" as shown in the drawing in accordance with detection that the RF center value has fallen below the α value switching threshold value 43.

In other words, when it is detected that the RF center value deviates towards the minimum value side and that the amplitude level of the maximum value side of the RF signal exceeds a certain extent so as to become smaller, the inclination of the value Peak-Bottom is switched over to correspond to a value "αB" that is larger than a value "αA".

Because of this, with the defect detection circuit 20 of this embodiment, the value Peak-Bottom faithfully follows the reducing inclination of the amplitude level of the actual RF signal in the period after time t3.

As a result, the defect detection circuit 20 of this embodiment is capable of detecting defect statuses at a faster time t4 compared with a time t4 a that is the timing at which a defect status is detected by the defect detection circuit 100 of the related art.

As can be understood by comparing the signal DEFECT obtained by the defect detection circuit 20 of this embodiment shown by the signal DEFECT1 in the drawings and the signal DEFECT obtained by the defect detection circuit 100 of the related art shown as DEFECT2, in the related art, only the time from time t4 a after time t4 to time t6 constitutes a detection period, whereas in this embodiment, a comparatively long defect detection period scanning from time t4 to time t6 can be obtained.

A view comparing the operations obtained for the defect detection circuit 20 and the defect detection circuit 100 in the case of obtaining the same RF signal as for the case of FIG. 6 previously is shown in FIG. 8.

In this case, at the defect detection circuit 100 of the related art, when the minimum value of the RF signal is in the increasing direction as shown in the drawing, the value Peak-Bottom increases at an increasing width corresponding to the fixed value "β".

Therefore, with the defect detection circuit 100 of the related art, when only the amplitude level of the minimum value side of the RF signal becomes small, the value Peak-Bottom cannot increase with a fixed inclination, and cannot follow along the reducing inclination of the amplitude level of the actual RF signal.

With regards to this, with the defect detection circuit 20 of this embodiment, as described previously, at the time t3 shown in the drawing, the inclination of the value Peak-Bottom changes from being according to the value "βA" to being according to the value "βB" as shown in the drawing in accordance with detection that the RF center value has risen above the β value switching threshold value 45.

Because of this, with the defect detection circuit 20 of this embodiment, the value Peak-Bottom follows along the reducing inclination of the amplitude level of the actual RF signal in the period after time t3.

Therefore, in this case also, the defect detection circuit 20 of this embodiment is capable of detecting defect statuses at a faster time t4 compared with a time t4 a that is the timing at which a defect status is detected by the defect detection circuit 100 of the related art.

In this case also, with regards to the related art shown in the drawings only being able to attain a defect detection period from time t4 a after the time t4 until time t6, in this embodiment, it is possible to obtain a defect detection period spanning a relatively long period from time t4 to time t6.

In the description up to this point, a description is given of the cases where the operation obtained at the defect detection circuit 20 of this embodiment when amplitude level of an RF signal becomes considerably smaller alone on one of either the maximum value side or the minimum value side. However, the case is now considered using the following FIG. 9A and FIG. 9B where amplitude level of both the maximum value side and the minimum value side of the RF signal become smaller.

Figure 9A:
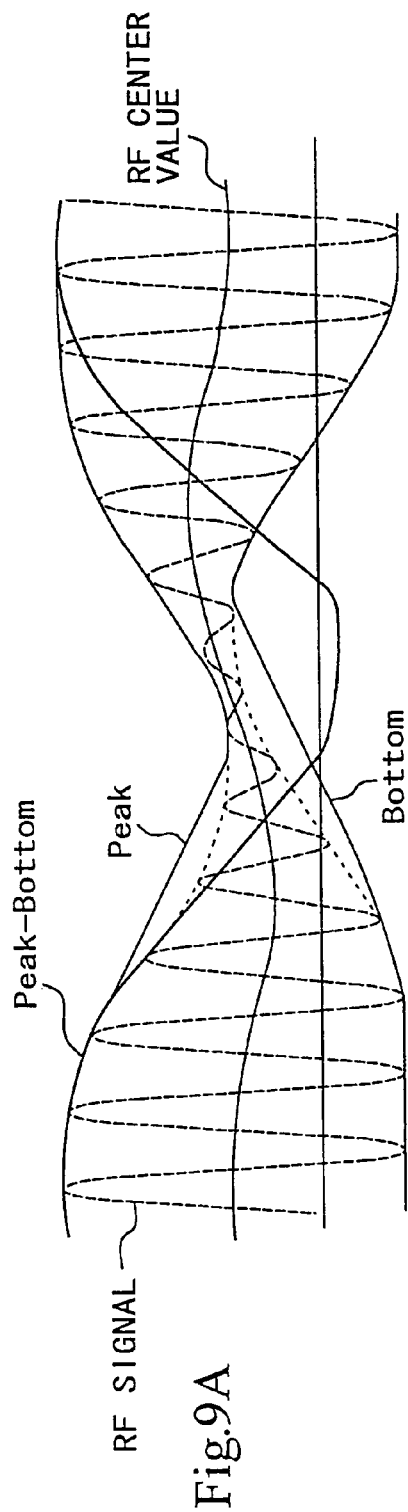
FIG. 9A and FIG. 9B are views illustrating an operation obtained for a defect detection apparatus given as the embodiment for the case where amplitude level of both a maximum value side and a minimum value side of an RF signal fall.
Figure 9B:
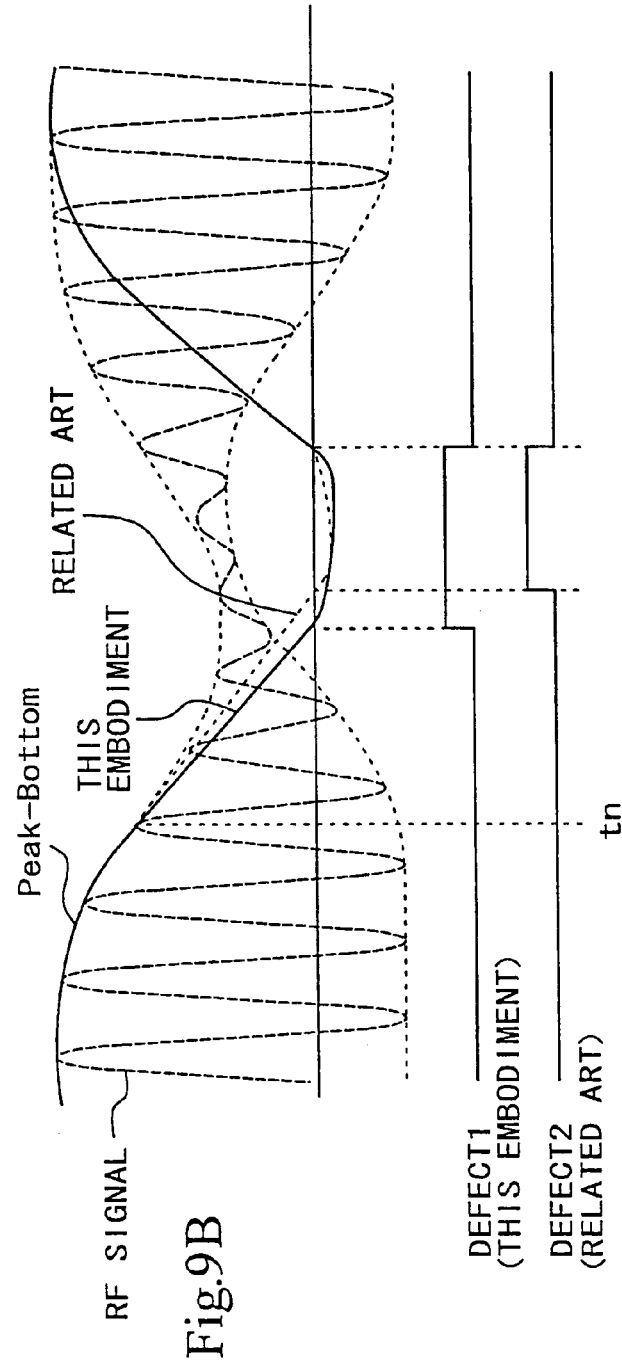

In FIG. 9A and FIG. 9B, first, as shown in FIG. 9A, in the case where amplitude levels of both the maximum value side and the minimum value side of the RF signal become smaller, the value Peak reduces, and the value Bottom increases.

In other words, in this case, it is possible to follow the fall in the amplitude level from both the maximum value side and the minimum value side of the RF signal, and as a result, the value Peak-Bottom shown in the drawings reduces with a comparatively large reduction width.

Therefore, in this case, even if the reduction width of the value peak and the increasing width of the value Bottom are both fixed as in the related art, it is possible for the value Peak-Bottom to follow comparatively along with drops in the amplitude level of the actual RF signal.

However, taking into consideration cases where, for example, the RF center value shown in the drawing falls or increases in excess of the α value switching threshold value 43 or the β value switching threshold value 45, at the defect detection circuit 20 of this embodiment, in this kind of case it is possible for the reduction width of the value Peak or the increasing width of the value Bottom to be increased by changing the subtraction value α and the addition value β to larger values. The reduction width of the value Peak-Bottom is therefore also increased in accompaniment with this.

A view comparing the operation of the defect detection circuit 20 of this embodiment in this case and the operation of the defect detection circuit 100 of the related art is shown in FIG. 9B. Taking the time at which the RF center value is detected to exceed the α value switching threshold value 43 or the β value switching threshold value 45 as time tn, even after the time tn, the value Peak-Bottom of the defect detection circuit 100 of the related art maintains its reduction width for before this time tn.

With regards to this, with the defect detection circuit 20 of this embodiment, from the time tn onwards the reduction width of the value Peak-Bottom can be increased from that of before this time tn by switching over the subtraction value α or the addition value α to a larger value.

In other words, with the defect detection circuit 20 of this embodiment, even when the amplitude level on both the maximum value side and the minimum value side of the RF signal becomes smaller, in cases where the RF center value exceeds the α value switching threshold value 43 or the β value switching threshold value 45 so as to fall below or exceed these values, it is possible to detect defect statuses more rapidly than in the related art, as shown in the drawings.

In the above, a description is given of the defect detection circuit 20 of this embodiment.

As described above, the center value detection circuit 36 is provided for the defect detection circuit 20 of this embodiment, and calculates an RF center value indicating a center value of the amplitude of the RF signal.

In accompaniment with this, when, for example, the calculated RF center value level is detected by the center value detection circuit 36 to have risen above the α value switching threshold value 43, an operation of switching over the subtraction value of the subtraction circuit 30 to the value αB that is larger than the value αA is obtained. Further, when, for example, the calculated RF center value level is detected to have fallen below the β value switching threshold value 45, an operation of switching over the addition value of the addition circuit 35 to the value βB that is larger than the value αA is obtained.

As a result of this, with the defect detection circuit 20 of this embodiment, in cases where it is detected that the level of the RF center value exceeds the α value switching threshold value 43 or the β value switching threshold value 45 and one of either the maximum value side or the minimum value side of the amplitude level of the RF signal is alone becoming smaller, the reduction width of the value Peak-Bottom indicating the amplitude level of the RF signal is made to increase.

As a result of increasing the reduction width of the value Peak-Bottom, in cases where it is detected that one of either the maximum value side or the minimum value side of the amplitude level of the RF signal is becoming smaller, it is possible for the value Peak-Bottom to be made to closely follow the falling inclination of the amplitude level of the actual RF signal.

Further, in accompaniment with this, as can be understood from the description up to now, the defect detection circuit 20 of this embodiment does not adopt a configuration of simply utilizing the section maximum value and section minimum value detected from the RF signal as is, but rather the value Peak and the value Bottom do not follow falls in the amplitude level of the actual RF signal as is. In other words, incorrect defect detection in cases where the amplitude level of the RF signal suddenly changes is prevented.

As a result, the defect detection circuit 20 of this embodiment maintains erroneous defect detection prevention functions of the related art, and dramatically increases the accuracy of defect detection from that of the related art in cases where one of either the maximum value side or the minimum value side of the amplitude level of an RF signal alone becomes smaller.

In this manner, by increasing defect status detection accuracy from that of the related art, it is possible to detect defects with the same degree of accuracy as the related art even when, for example, sampling frequency during A/D conversion of an RF signal is dropped to a certain extent.

In the above embodiment, an example is given where a disc playback apparatus O compatible with a CD-format optical apparatus is taken as the playback apparatus to which the defect detection apparatus of the present invention is applied. However, the defect detection apparatus of the present invention may also be applied to other apparatuses such as playback apparatuses compatible with discs of formats such as, for example, DVD (Digital Versatile Disc) and MD (Mini Disc: magneto-optical discs), etc.

Further, as well as playback apparatuses compatible with disc media, application is possible in all playback apparatuses such as, for example, playback apparatuses compatible with tape recording media recorded with digital data, where a signal read from a recording medium is put into the form of an RF signal, so as to have characteristics where the amplitude of the RF signal becomes small due to defects (blemishes, deposits, etc.) on the recording media.

Further, in the preferred embodiment of the present invention, only two values, A and B, are set as the subtraction value α and the addition value β varying according to changes in the level of the RF signal but it is also possible to set three values or more for the subtraction value a and the addition value β.

In other words, two or more different threshold values may be provided for the α value switching threshold value 43 and the β value switching threshold value 45 as shown in FIG. 3, with a larger value than the subtraction value α or the addition value β being switched to in response to the RF center value exceeding a first threshold value, and a still larger value than the subtraction value a or the addition value β being switched to in response to the RF center value exceeding the second threshold value.

By doing this, when the amplitude level of the RF signal falls on one of either the maximum value side or the minimum value side, it is possible to increase the reduction width of the value Peak-Bottom according to the extent of this deviation.

In other words, the reduction width of the value Peak-Bottom is increased according to the deviation of the fall of the amplitude level, and the value Peak-Bottom can therefore be made to more faithfully follow falling of the amplitude level of the actual RF signal.

As a result, according to this modified example, defect detection can be carried out with further increased accuracy.

INDUSTRIAL APPLICABILITY

With the present invention described above, when the section maximum value detected from an RF signal is in a reducing direction, a subtraction results value resulting from subtracting a required subtraction value (value α) from a section maximum value is outputted as a maximum value (value Peak). Further, together with this, when the section minimum value detected from an RF signal is in an increasing direction, an addition results value resulting from adding a required addition value (value α) to a section minimum value is outputted as a minimum value (value Bottom).

In addition, an RF amplitude value (value Peak-Bottom) indicating the amplitude level of an RF signal is obtained by subtracting the minimum value from the maximum value outputted in the above manner. In this way, erroneous defect detection in cases where the amplitude level of the actual RF signal changes abruptly can be prevented.

As a result of the above, in the present invention, when the center value of the amplitude of the RF signal exceeds a prescribed value so as to increase or decrease so that the amplitude level of the RF signal falls on the maximum value side or the minimum value side, the subtraction value or the addition value are variably set in response to this.

In addition, if, for example, the variable subtraction value and addition value are set to be values that are larger than normal, it is possible to make the reduction width of the maximum value or the increasing width of the minimum value accompanying the lowering of the amplitude level of the RF signal larger than usual. That is, in accompaniment with this, it is possible to make reduction width larger even for an RF amplitude value calculated from the maximum value and the minimum value.

As a result of the above, in the present invention, in cases where the maximum value side or the minimum value side of the amplitude level of an RF signal alone becomes smaller, it is possible for an RF amplitude width value to be faithfully followed by the lowering inclination of the amplitude level, and it is possible for erroneous defect detection to be prevented as described above.

In other words, in the present invention, detection of defect statuses can be carried out with a higher degree of accuracy while maintaining the erroneous defect detection prevention functions of the related art.

The invention claimed is:

1. A defect detection apparatus characterized by:
   maximum value detection means for obtaining a detection maximum value by detecting a maximum value of an RF signal obtained by an operation of reading out a signal from a recording medium;
   minimum value detection means for obtaining a detection minimum value by detecting a minimum value of said RF signal;
   maximum value output means for obtaining a subtraction results value for subtracting a required subtraction value from said detection maximum value when said detection maximum value obtained by said maximum value detection means is taken to be in a reducing direction, and outputting said subtraction results value as a maximum value of said RF signal;
   minimum value output means for obtaining an addition results value for adding a required addition value to said detection minimum value when said detection minimum value obtained by said minimum value detection means is taken to be in an increasing direction, and outputting said addition results value as a minimum value of said RF signal;
   amplitude level calculating means for calculating an RF amplitude value indicating an amplitude level of said RF signal by subtracting a minimum value outputted by said minimum value output means from a maximum value outputted by said maximum value output means;
   defect detection means for detecting a defect status by comparing an RF amplitude value calculated by said amplitude level calculating means with a prescribed threshold value;
   center value calculating means for calculating a center value of an amplitude of said RF signal based on a detection maximum value obtained by said maximum value detection means and a detection minimum value obtained by said minimum value detection means; and
   variable value setting means for variably setting said subtraction value occurring at said maximum value output means and said addition value occurring at said minimum value output means according to the level of said center value calculated by said center value calculating means.

2. The defect detection apparatus as described in claim 1, wherein
   said subtraction value in said maximum value storage means is variably set to a larger value according to said center value calculated by said center value calculating means becoming smaller than a prescribed threshold value, and said addition value in said minimum value storage means is variably set to a larger value according to said center value becoming bigger than a prescribed threshold value.

3. A defect detection method characterized by execution of:
   a maximum value detection process of obtaining a detection maximum value by detecting a maximum value of an RF signal obtained by an operation of reading out a signal from a recording medium;
   a minimum value detection process of obtaining a detection minimum value by detecting a minimum value of said RF signal;
   a maximum value output process of obtaining a subtraction results value for subtracting a required subtraction value from said detection maximum value when said detection maximum value obtained by said maximum value detection process is taken to be in a reducing direction, and outputting said subtraction results value as a maximum value of said RF signal;
   a minimum value output process of obtaining an addition results value for adding a required addition value to said detection minimum value when said detection minimum value obtained by said minimum value detection process is taken to be in an increasing direction, and outputting said addition results value as a minimum value of said RF signal;
   an amplitude level calculating process of calculating an RF amplitude value indicating an amplitude level of said RF signal by subtracting a minimum value outputted by said minimum value output process from a maximum value outputted by said maximum value output process;
   a defect detection process of detecting a defect status by comparing an RF amplitude value calculated by said amplitude level calculating process with a prescribed threshold value;
   a center value calculating process of calculating a center value of an amplitude of said RF signal based on a detection maximum value obtained by said maximum value detection process and a detection minimum value obtained by said minimum value detection means; and
   a variable value setting process of variably setting said subtraction value subtracted by said maximum value output process and said addition value added by said minimum value output process according to the level of said center value calculated by said center value calculating process.

* * * * *